(12) United States Patent
Kamiki

(10) Patent No.: US 6,601,916 B1
(45) Date of Patent: Aug. 5, 2003

(54) CHILD SEAT

(76) Inventor: Hiroshi Kamiki, 11-1, Honmachi 5-chome, Toyanaka-shi Osaka, 560-0021 (JP)

( * ) Notice: Subject to any disclaimer, the term of this patent is extended or adjusted under 35 U.S.C. 154(b) by 0 days.

(21) Appl. No.: 09/926,336

(22) PCT Filed: Apr. 25, 2001

(86) PCT No.: PCT/JP01/03592
§ 371 (c)(1),
(2), (4) Date: Oct. 15, 2001

(87) PCT Pub. No.: WO01/85488
PCT Pub. Date: Nov. 15, 2001

(30) Foreign Application Priority Data

| Apr. 10, 2000 | (JP) | 2001-111140 |
| May 11, 2000 | (JP) | 2000-138113 |
| Jul. 4, 2000 | (JP) | 2000-201722 |

(51) Int. Cl.[7] ................................................. A47D 1/10
(52) U.S. Cl. .................... 297/250.1; 297/465; 297/467; 297/485; 297/452.41; 297/DIG. 3
(58) Field of Search ............................. 297/250.1, 465, 297/485, 452.41, DIG. 3, 440.1, 440.15, 467

(56) References Cited

U.S. PATENT DOCUMENTS

| 3,265,438 A | * | 8/1966 | Regan et al. ............. 297/250.1 |
| 3,827,716 A | * | 8/1974 | Vaughn et al. .......... 297/465 X |
| 4,026,245 A | * | 5/1977 | Arthur .................... 297/465 X |
| 4,687,452 A | * | 8/1987 | Hull ........................ 297/250.1 |
| 4,759,569 A | * | 7/1988 | Potter ..................... 297/465 X |
| 4,836,605 A | * | 6/1989 | Greenwood et al. ..... 297/250.1 |
| 4,943,112 A | | 7/1990 | Law ....................... 297/467 X |
| 5,005,902 A | * | 4/1991 | Farnworth et al. ....... 297/250.1 |
| RE34,051 E | | 9/1992 | Deegener et al. ............ 297/468 |
| 5,149,172 A | | 9/1992 | Davis ................ 297/DIG. 3 X |
| 5,292,175 A | * | 3/1994 | Artz ........................ 297/250.1 |
| 5,335,968 A | * | 8/1994 | Sheridan et al. ......... 297/250.1 |
| 5,499,860 A | | 3/1996 | Smith et al. ............ 297/485 X |
| 5,516,188 A | * | 5/1996 | Bruhnke et al. ..... 297/250.1 X |
| 5,913,570 A | | 6/1999 | Yoshida et al. |
| 5,916,089 A | | 6/1999 | Ive ......................... 297/467 X |
| 5,957,537 A | * | 9/1999 | Hoolahan ............ 297/250.1 X |
| 5,988,744 A | | 11/1999 | Franchak ............... 297/256.17 |
| 6,059,360 A | * | 5/2000 | Bedard .................... 297/250.1 |
| 6,095,614 A | * | 8/2000 | Canna et al. ........... 297/485 X |
| 6,179,383 B1 | * | 1/2001 | Ochi ....................... 297/250.1 |
| 6,254,184 B1 | * | 7/2001 | Kontos ................... 297/465 X |
| 6,314,578 B1 | * | 11/2001 | Masuda et al. ......... 297/465 X |
| 6,322,149 B1 | | 11/2001 | Conforti et al. ........ 297/483 X |
| 6,354,665 B1 | * | 3/2002 | Ross ................... 297/250.1 X |

* cited by examiner

Primary Examiner—Rodney B. White
(74) Attorney, Agent, or Firm—Armstrong, Westerman & Hattori, LLP.

(57) ABSTRACT

A safety seat for children including a seat surface portion (10) is made in an air cushion structure expanding due to an injection of air. A back rest reclining portion (20) connected to the seat surface portion (10) is formed in a vest shape so as to fix the child the safety seat. An air cushion (23) is mounted to the back rest reclining portion (20). It is possible to fold up the seat surface portion (10) and the back rest reclining portion (20) by taking the air out. In spite of the flexible structure, which can be easily transferred and stored, it is possible to allow a child to sit at a high position and prevent a cooped-up feeling.

12 Claims, 25 Drawing Sheets

FIG.18(a)
FIG.18(c)
FIG.18(b)
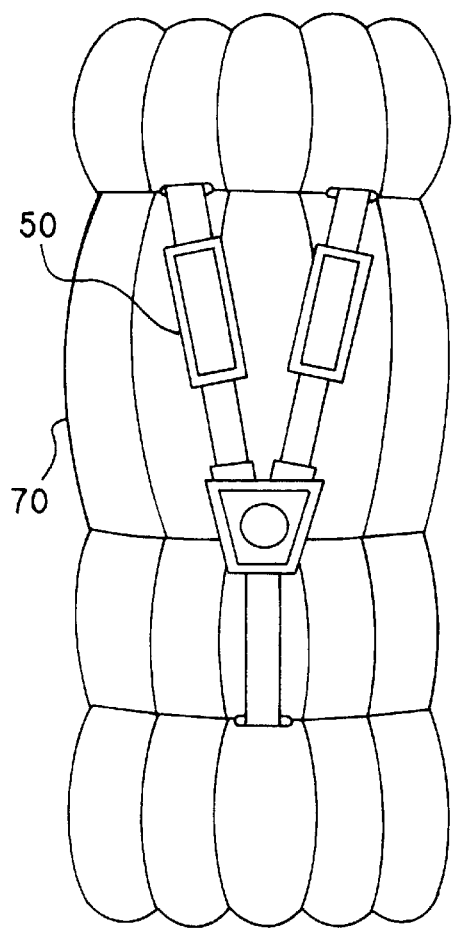
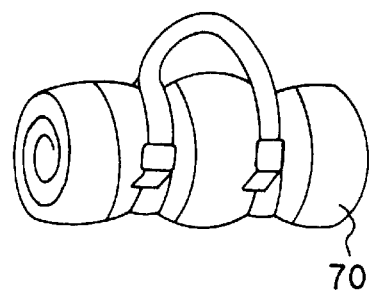
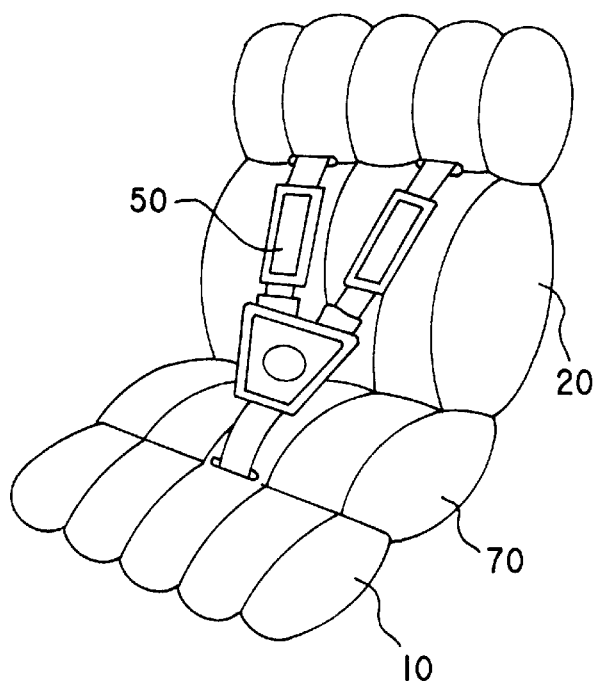

FIG.19(a)
FIG.19(c)
FIG.19(b)
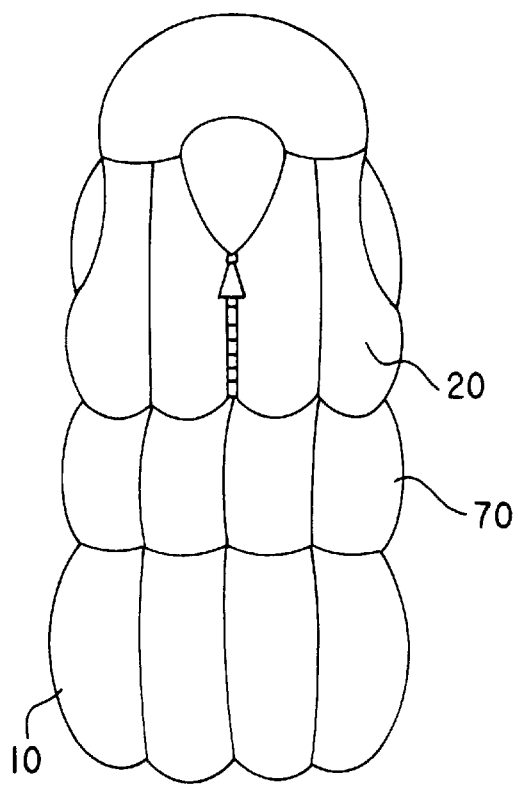
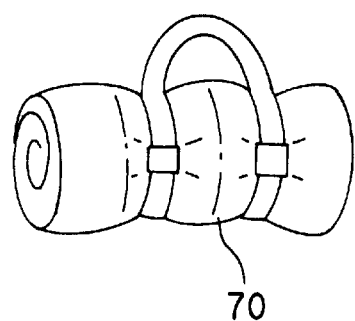
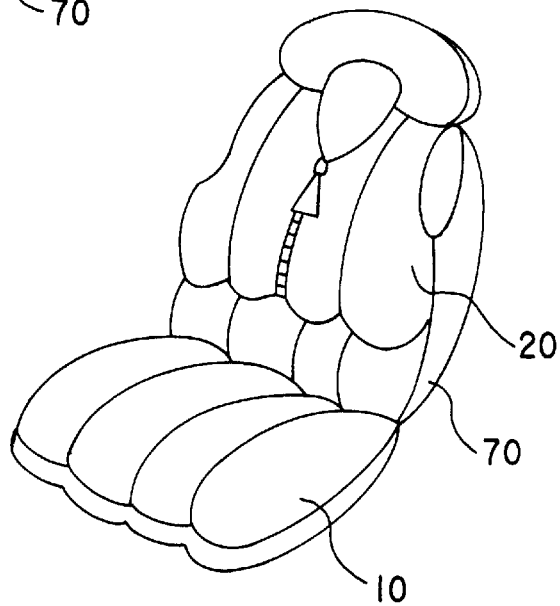

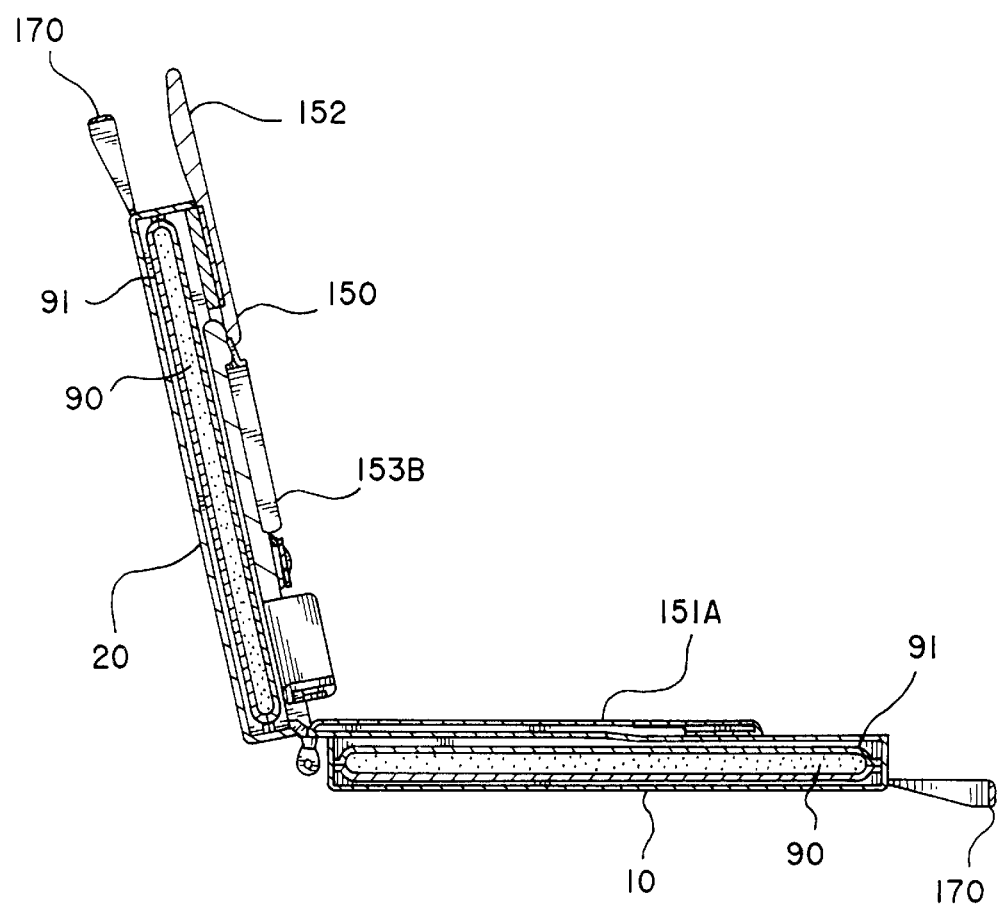

CHILD SEAT

TECHNICAL FIELD

The present invention relates to a safety seat for children that is attached to a seat of a motor vehicle and protects a child from an impact, an external discharge from a vehicle or the like at a time of collision.

PRIOR ART

Importance of safety seats for children is a common recognition in all the countries in the world, and in our country as well, an amendment of Road Traffic Law that includes such obligations for wearing a safety seat for children went into effect in April, 2000. Together therewith, there has been developed various kinds of safety seats for children, however, in view of the necessity to meet safety standards, basic structures thereof are substantially common.

That is, most of the safety seats for children are provided with a seat-shaped main body portion obtained by combining a seat surface portion and a back rest reclining portion so as to make it compact in correspondence to a body shape of the child, and are structured such that the main body portion is mounted on a base portion except a part thereof. Then, by using a seat belt, the main body portion is fixed to a seat of a motor vehicle, and the child is fixed by a belt provided in the main body portion.

It is needless to say that the safety seat for children having such a basic structure has high safety, however, on the contrary, since a size and a weight of the safety seat for children are increased, there are problems that it is not easily attached to and detached from a seat of a motor vehicle, as well as such a safety seat for children is not easily stored and carried.

As a structure for solving the problems in view of handling, there has been developed a wear type safety seat for children. This is structured such that a crotch belt or the like is attached to a vest type main body portion so as to obtain a fixing function to the child, as well as a seat belt of the motor vehicle is passed through a back portion thereof so as to obtain a fixing function to the seat.

It is needless to say that the safety seat for children of such a flexible structure has a greater handling property. Further, it is allowed by the safety standard and has no problem in view of safety. However, in accordance with the safety seat for children of this kind, the child directly sits on a seat surface of the motor vehicle, and in most cases, an eye line is disposed below a window and screened by a door. As a result, the child has a great cooped-up feeling.

First of all, the safety seat for children restrains the child without relation to the type thereof and gives not a little uncomfortable feeling, so that it is said to be a great problem to give a cooped-up feeling so as to increase an uncomfortable feeling.

Further, the wear type safety seat for children applied a great pressure to shoulder portions of the child at a time of collision and in some cases there is a risk that a clavicle is broken.

The present invention is made by taking the matters mentioned above into consideration, and an object of the present invention is to provide a safety seat for children which can of course secure a high safety, is excellent in a handling property and can widely reduce an uncomfortable feeling of a child.

DISCLOSURE OF THE INVENTION

In order to achieve the object mentioned above, a safety seat for children according to the present invention, comprising: a seat surface portion having a flexible structure; and a back rest reclining portion having a flexible structure, characterized in that at least the seat surface portion among the seat surface portion and the back rest reclining portion is constituted by an airtight bag body expanding due to an injection of gas so as to form an air cushion, at least the back rest reclining portion among the seat surface portion and the back rest reclining portion has a fixing mechanism with respect to a child, and at least one of the seat surface portion and the back rest reclining portion has a fixing mechanism with respect to a seat of a motor vehicle.

In accordance with the safety seat for children according to the present invention, in spite that the seat surface portion and the back rest reclining portion have the flexible structure, it is possible to sit the child at a high position and it is possible to make an eye line high, whereby it is possible to remove a cooped-up feeling. Further, since at least the back rest reclining portion among the seat surface portion and the back rest reclining portion has the fixing mechanism with respect to the child, it is possible to secure a necessary safety.

The fixing mechanism with respect to the child can be constituted by a wear type, preferably a vest shaped wear type fixing portion. Accordingly, it is possible to securely fix the child.

The wear type fixing portion can be structured such that an air cushion is provided in at least a part thereof, preferably in at least both shoulder portions, and more preferably in a portion extending from both shoulder portions to a back. Accordingly, it is possible to increase an impact absorbing property and improve a safety. Further, a sitting feeling can be improved.

The wear type fixing portion can be combined with a crotch hanging type fixing belt. Accordingly, it is possible to more securely fix the child.

The wear type fixing portion can be combined with a pants type fixing portion. Accordingly, it is possible to more securely fix the child.

The wear type fixing portion can be commonly used as the back rest reclining portion. Accordingly, a structure can be simplified.

The wear type fixing portion commonly used as the back rest reclining portion can be structured so as to be attached to and detached from the seat surface portion. Accordingly, it is possible to improve a mounting property to the child.

The fixing mechanism with respect to the child may be a multi-point supporting type fixing belt. The fixing mechanism with respect to the seat of the motor vehicle is provided in at least one of the seat surface portion and the back rest reclining portion, however, in view of preventing the back rest reclining portion from being bent forward so as to be fallen down at a time of being exposed to an impact, it is preferable to provide it in the portion including the back rest reclining portion, and in the case of using the wear type fixing portion, it is preferable to provide it therein.

The seat surface portion and the back rest reclining portion can be constituted by an airtight bag body. Accordingly, a sitting feeling can be improved and a safety can be improved.

In this case, the seat surface portion and the back rest reclining portion may be structured so as to form a seat-shaped air cushion in a state that the gas is injected, or may be structured so as to form a mat-shaped air cushion in a state that the gas is injected and to deform along the seat surface and the back rest reclining portion in a state of being mounted to the seat of the motor vehicle, thereby forming a seat-shaped air cushion. In the latter case, it is possible to be folded particularly in a compact size in a state that the air is taken out.

BRIEF DESCRIPTION OF THE DRAWINGS

FIG. 4 (*b*) is a schematic view of a stopper used at a time of mounting the safety seat for children on a seat of a motor vehicle.

FIG. 18 are schematic views of a structure and a used state of a safety seat for children in accordance with a fifth embodiment of the present invention, in which FIG. 18(*a*) shows a non-attached state, FIG. 18(*b*) shows an attached state and FIG. 18(*c*) shows an accommodated state.

FIG. 19 are schematic views of a structure and a used state of a safety seat for children in accordance with a sixth embodiment of the present invention, in which FIG. 19(*a*) shows a non-attached state, FIG. 9(*b*) shows an attached state and FIG. 19(*c*) shows an accommodated state.

FIG. 25 is a sectional view of a state of closing the safety seat for children in accordance with the eighth embodiment of the present invention.

DESCRIPTION OF REFERENCE NUMERALS

10 SEAT SURFACE PORTION
20 BACK REST RECLINING PORTION
30 CROTCH HANGING TYPE FIXING BELT
40 PANTS TYPE FIXING PORTION
50 FIXING BELT
60 BABY CUSHION
70 AIRTIGHT BAG BODY
80 WEAR TYPE FIXING PORTION
90 SEAT BELT
100 STOPPER

BEST MODE FOR CARRYING OUT THE INVENTION

In accordance with the accompanying drawings, embodiments of the invention will be described in detail.

Figure 1:
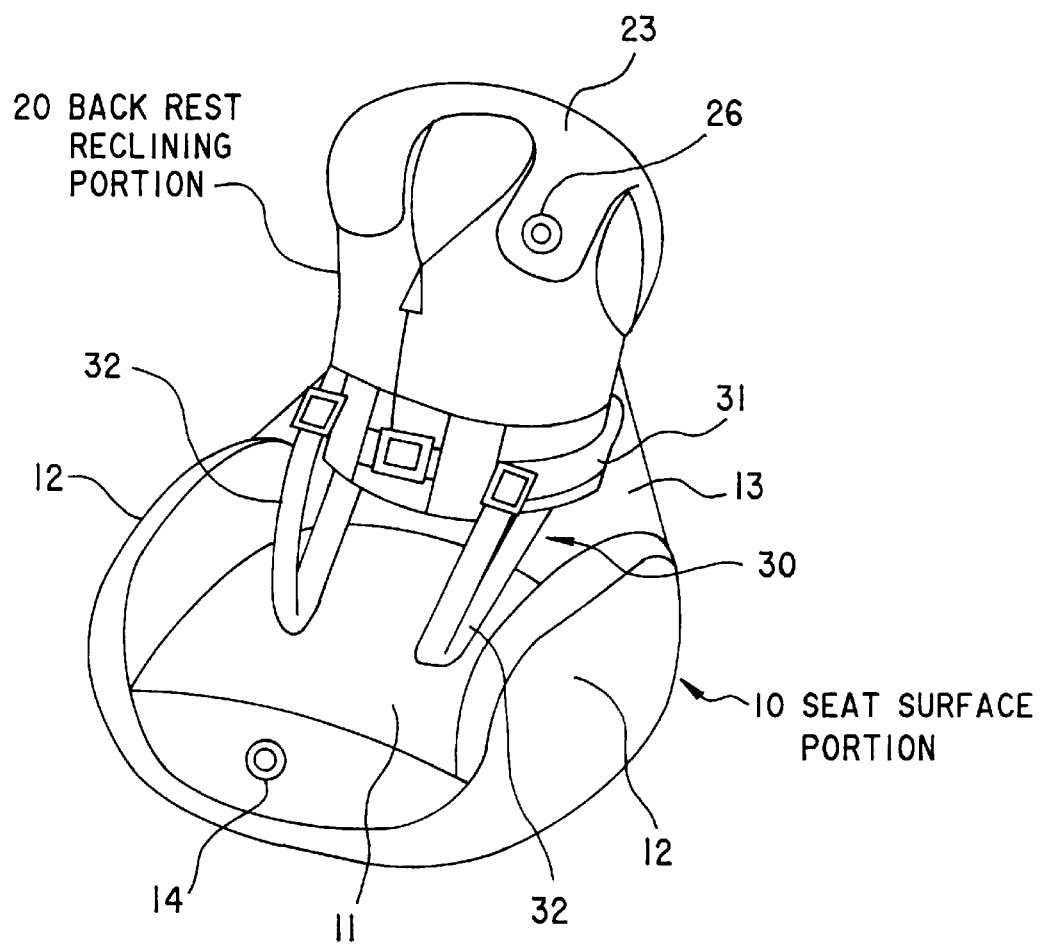
FIG. 1 is a perspective view of a safety seat for children in accordance with a first embodiment of the present invention.
Figure 2:
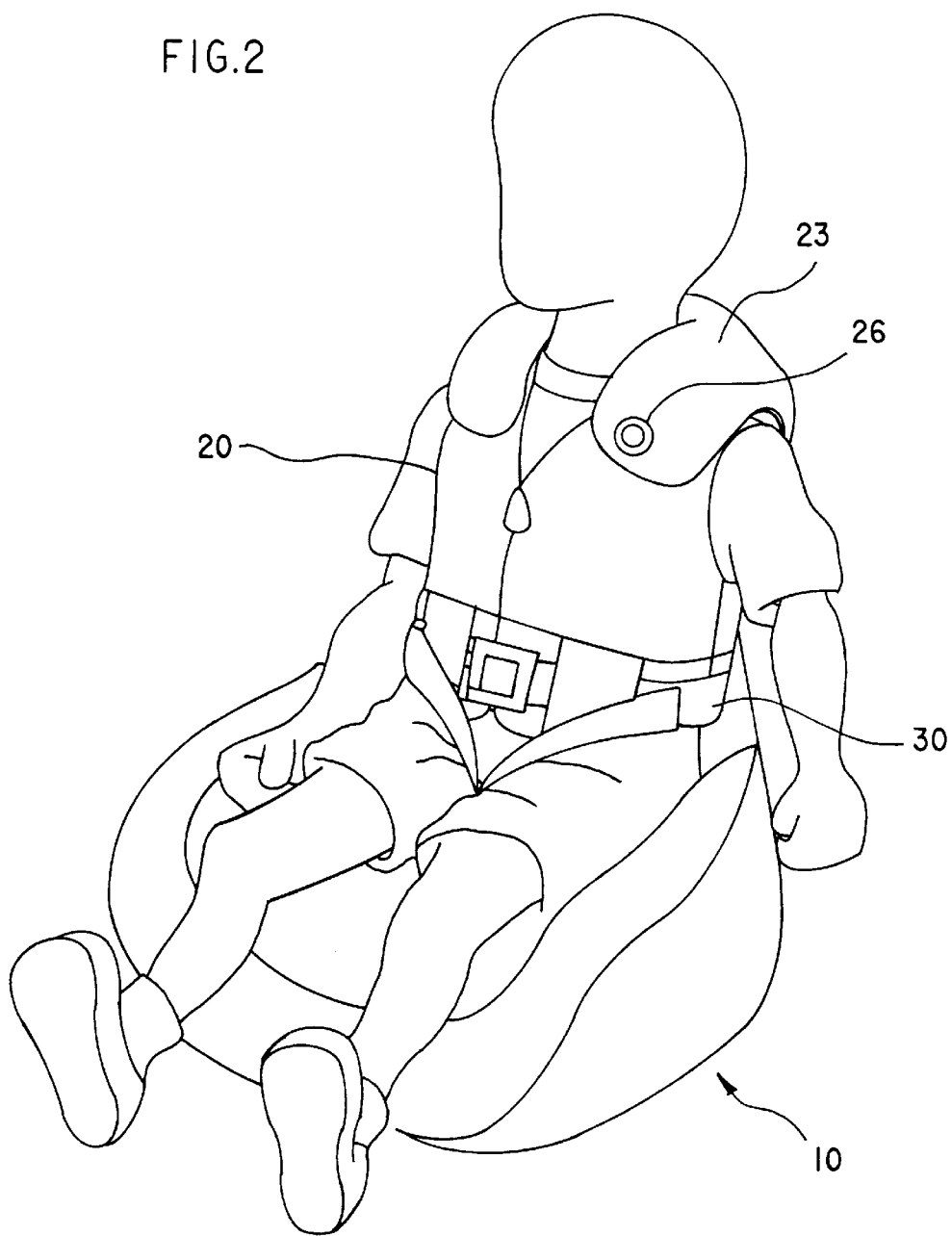
FIG. 2 is a perspective view showing a used state of the safety seat for children.
Figure 3:
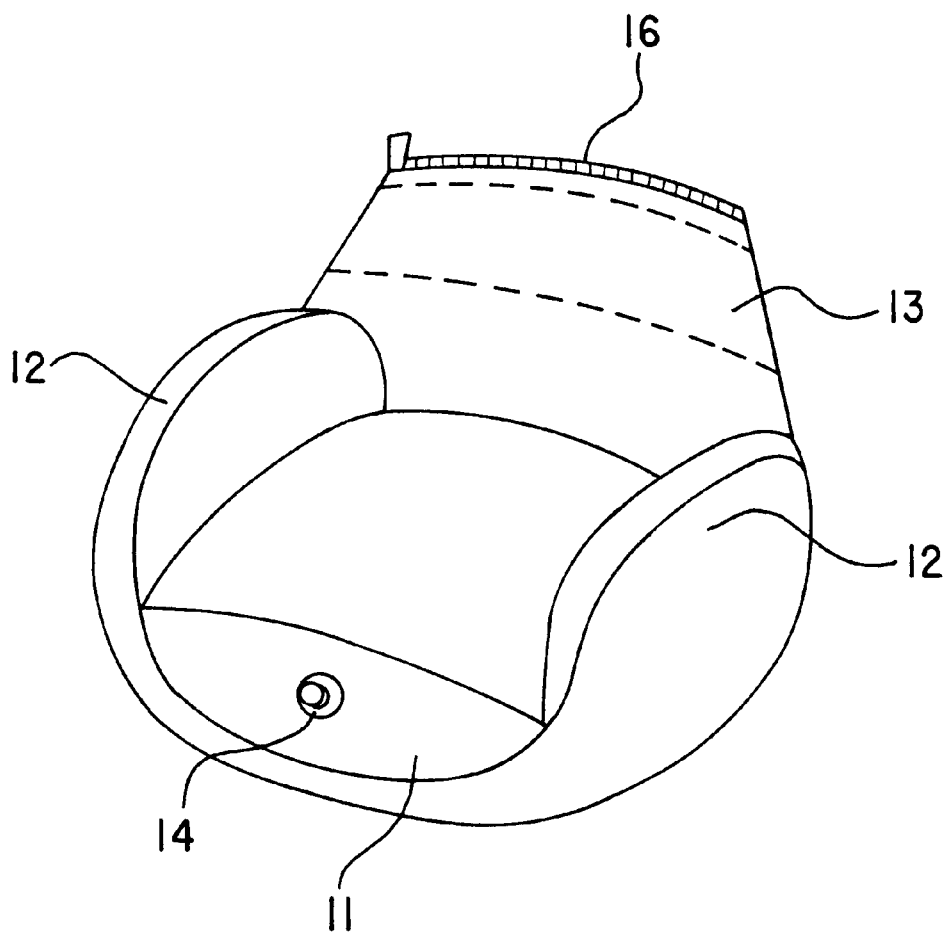
FIG. 3 is a perspective view of a seat surface portion of the safety seat for children.
Figure 4A:
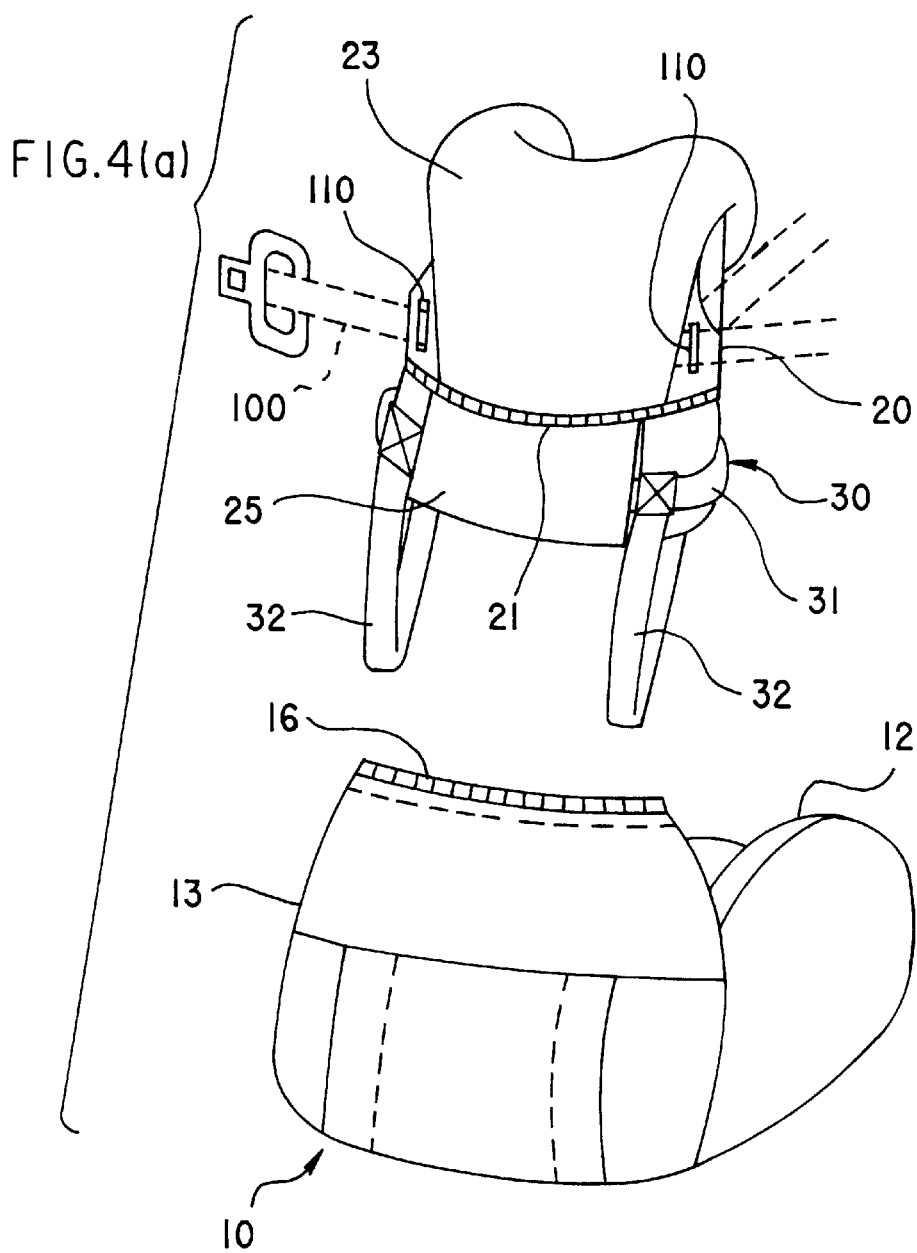
FIG. 4(*a*) is a perspective view from a back surface side of the safety seat for children and shows a state that a seat surface portion and a back rest reclining portion are separated.
Figure 4B:
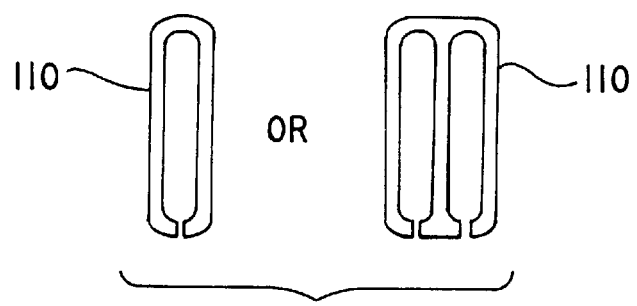
Figure 5:
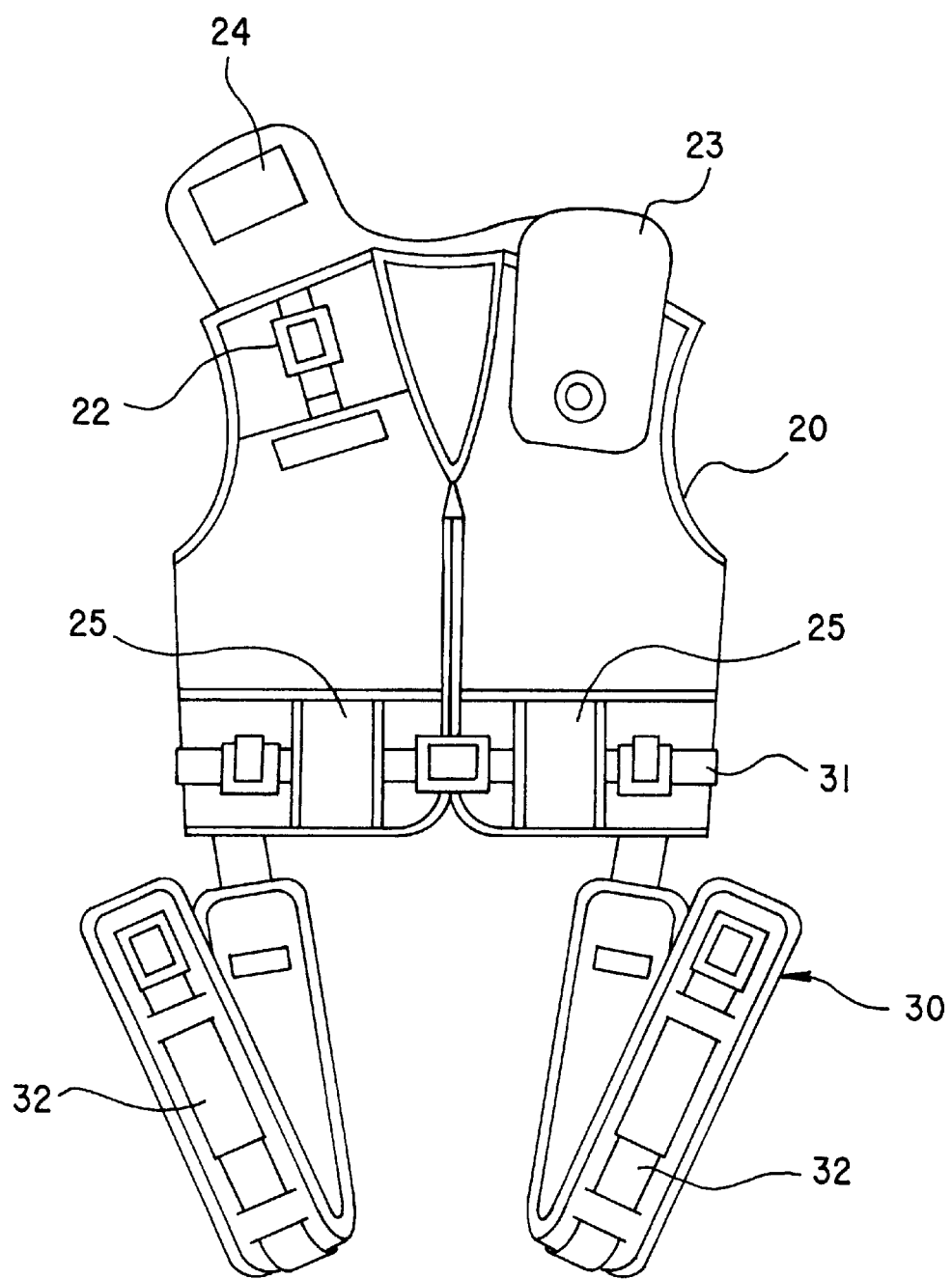
FIG. 5 is a front view of the back rest reclining portion of the safety seat for children.
Figure 6:
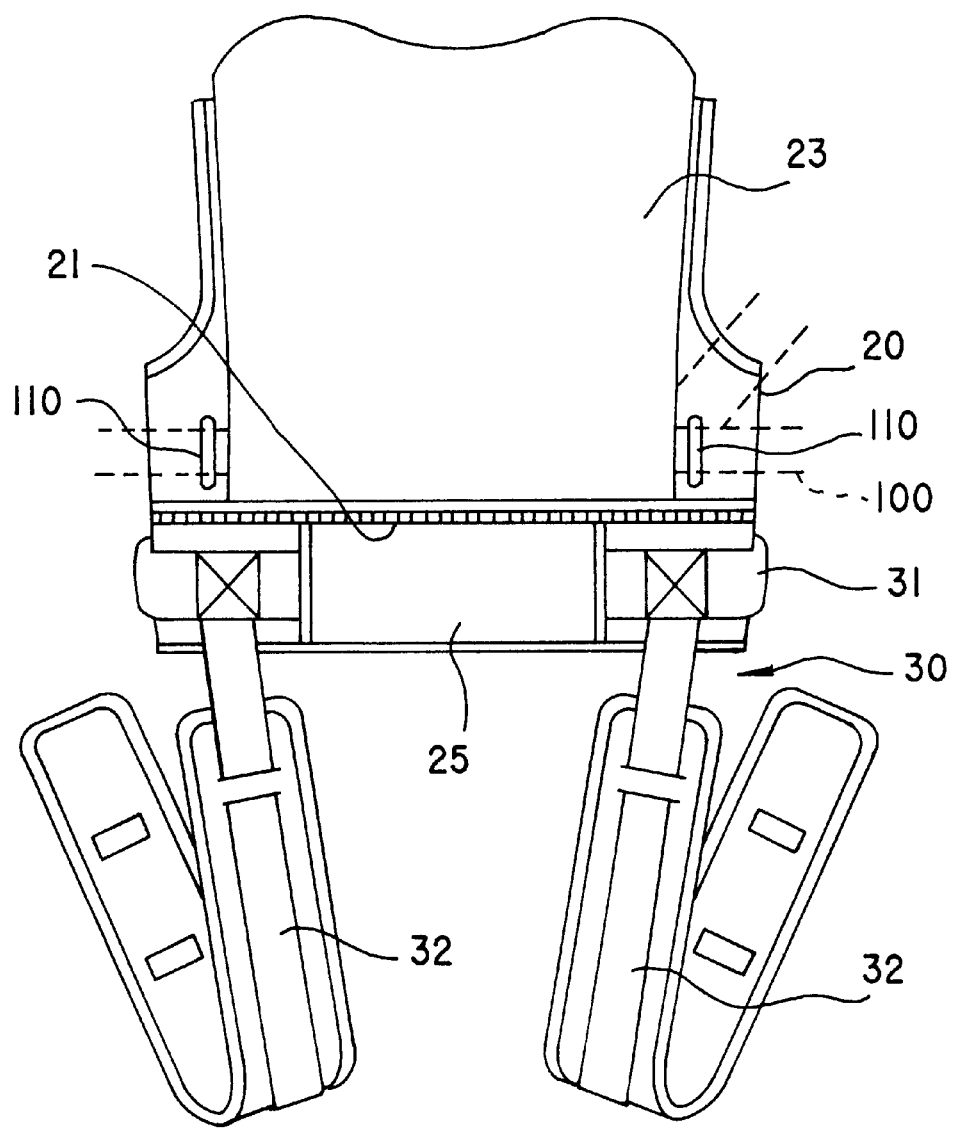
FIG. 6 is a rear view of the back rest reclining portion.

FIGS. 1 to 6 show a first embodiment in accordance with the present invention, in which FIG. 1 is a perspective view of a safety seat for children in accordance with the first embodiment, FIG. 2 is a perspective view showing a used state of the safety seat for children, FIG. 3 is a perspective view of a seat surface portion of the safety seat for children, FIG. 4 are a perspective view from a back surface side of the safety seat for children and a schematic view of a stopper, FIG. 5 is a front view of the back rest reclining portion of the safety seat for children, and FIG. 6 is a rear view of the back rest reclining portion.

The safety seat for children in accordance with the first embodiment is, as shown in FIGS. 1 and 2, constituted by a seat surface portion 10 having an air cushion structure, a wear type back rest reclining portion 20 commonly used as a fixing portion, and a crotch hanging type fixing belt 30 combined with the back rest reclining portion 20.

The seat surface portion 10 is, as shown in FIGS. 3 and 4, constituted by a main body portion 11 which mainly receives a weight of a child, a pair of first holding portions 12 and 12 protruding upward from both side portions of the main body portion 11 and a comparatively thin second holding portion 13 extending upward from an end portion in a back surface side of the main body portion 11, and is formed in such a manner as to surround a waist portion of the child from three directions. Then, these portions are constituted by an integrally formed airtight bag body, and are expanded as illustrated by being injected with an air from an air injection port 14 provided on a front surface of the main body portion 11 so as to form an air cushion having a predetermined shape. A fastener 16 is attached in an upper edge portion of the second holding portion 13 for the purpose of connecting to the back rest reclining portion 20.

The wear type back rest reclining portion 20 is of a front open vest type. The back rest reclining portion 20 can be separated from the seat surface portion 10, and can be integrally formed with the seat surface portion 10 by connecting a fastener 21 laterally mounted to a portion of the back to the fastener 16 of the seat surface portion 10. The fastener 21 is provided a little above a lower end portion of the back rest reclining portion 20. Accordingly, a lower portion of the back rest reclining portion 20 overlaps on a front surface side of the second holding portion 13 in the seat surface portion 10.

The vest type back rest reclining portion 20 has size adjusting belts 22 in both shoulder portions, as shown in FIGS. 5 and 6. An air cushion 23 is mounted to a portion extending from both shoulders of the back rest reclining portion 20 to the back. The air cushion 23 is commonly used as a fixing mechanism with respect to the seat of the motor vehicle. That is, a seat belt 100 of the motor vehicle is passed between the main body of the back rest reclining portion 20 and the air cushion 23, and a lateral band portion of the seat belt 100 is fixed to the main body of the back rest reclining portion 20 in both sides of the air cushion 23 by a pair of stoppers 110 and 110, thereby fixing the safety seat for children to the seat of the motor vehicle. The stoppers 110 and 110 are formed, for example, in a hair pin shape, and are inserted into the main body of the back rest reclining portion 20, thereby fixing the lateral band portion of seat belt 100 to the main body thereof.

Both shoulder portions of the air cushion 23 are fixed by a surface fastener 24 for the purpose of operating the size adjusting belt 22. Three (two in front, and one in the rear) belt loops 25, 25 and 25 are provided in a lower portion of the back rest reclining portion 20 for the purpose of mounting the fixing belt 30. Reference numeral 26 denotes an air injection port of the air cushion 23.

The crotch hanging type fixing belt 30 is structured such that two crotch belts 32 and 32 are mounted to a waist belt 31, and is mounted to the back rest reclining portion 20 by passing the waist belt 31 through the belt loops 24, 24 and 24.

A using method and a function of the safety seat for children in accordance with the first embodiment are as follows.

The air is injected to the seat surface portion 10 of the safety seat for children, and the seat surface portion 10 is expanded until a predetermined rigidity is obtained. The back rest reclining portion 20 is connected to the seat surface portion 10. The fixing belt 30 is mounted on the back rest reclining portion 20 and the air is also injected to the air cushion 23. In this state, the safety seat for children is mounted to the seat of the motor vehicle so as to be fixed thereto by using the seat belt 100 and the stoppers 110 and 110. In this case, the air may be injected by an air pump using a cigar lighter in the motor vehicle as a power source.

Since the safety seat for children does not use a resin or metal flame, it is light, and it can be deformed even in a state that the air is injected to the seat surface portion 10 or the air cushion 23. Accordingly, it is easy to mount on the seat.

A child is seated on the seat surface portion 10 of the safety seat for children mounted on the seat of the motor vehicle, the vest type back rest reclining portion 20 is worn on the child and the fixing belt 30 is attached. Accordingly, the child is fixed to the safety seat for children. The structure may be made such that before the back rest reclining portion 20 is connected to the seat surface portion 10, the back rest reclining portion 20 is worn on the child and thereafter the back rest reclining portion 20 is connected to the seat surface portion 10.

The safety seat for children has a fixing function with respect to the child by itself, and the fixing function with respect to the child can be also achieved by fixing the fixing belt 30. In accordance with these structures, the child is securely fixed to the safety seat for children. Further, since particularly the main body of the back rest reclining portion 20 in the safety seat for children is fixed to the seat of the motor vehicle, it is possible to prevent the main body of the back rest reclining portion 20 from forward falling down at a time of receiving an impact.

Further, the child does not directly sit on the seat of the motor vehicle but sits on the seat surface portion 10. Accordingly, since an eye line of the child is made high and a cooped-up feeling is removed, an uncomfortable feeling is widely reduced in comparison with a case of directly sitting on the seat. Since the seat surface portion 10 has a cushion function in itself, a sitting feeling is good even when the cushion is not mounted thereon. In addition, since the air cushion 23 is also provided in the back rest reclining portion 20, a sitting feeling becomes further good, and an effect of reducing an impact at a time of collision, particularly an effect of protecting a clavicle of a child is increased.

Figure 20:
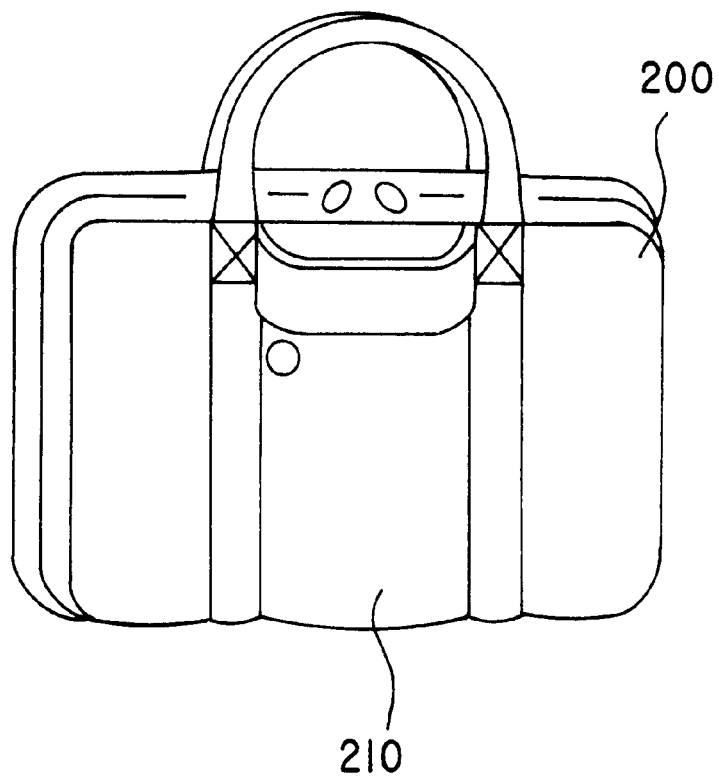
FIG. 20 is a perspective view of a bag for accommodating the safety seat for children in accordance with the present invention.

When taking the air out of the air cushion 23 of the seat surface portion 10 and the back rest reclining portion 20, the safety seat for children loses a rigidity so as to return its original flexible state. Accordingly, it is possible to fold up small, whereby it is possible to easily store and transfer. That is, as shown in FIG. 20, the safety seat for children from which the air is taken out may be stored in an exclusive bag 200. Reference numeral 210 in FIG. 20 denotes a accommodating portion of an air pump for inflating the air cushion 23.

As mentioned above, in accordance with the safety seat for children of the first embodiment, although the seat surface portion 10 and the back rest reclining portion 20 are made in the flexible structure which can be easily transferred and stored, it is possible to make the child sit at a high position, so that it is possible to widely reduce an uncomfortable feeling of the child.

Further, the back rest reclining portion 20 is commonly used as the fixing mechanism with respect to the child. Accordingly, it is comparatively compact.

Figure 7:
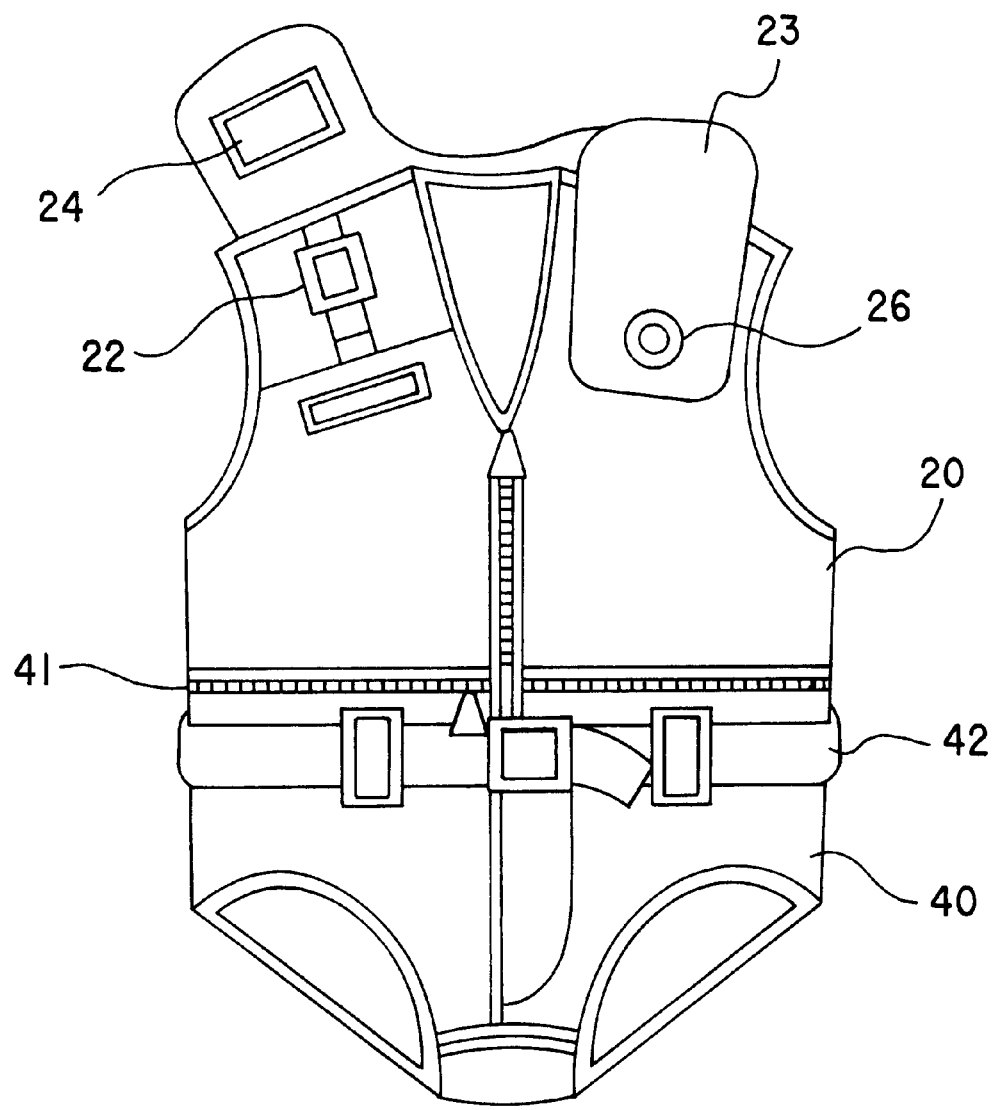
FIG. 7 is a front elevation view of another back rest reclining portion.
Figure 8:
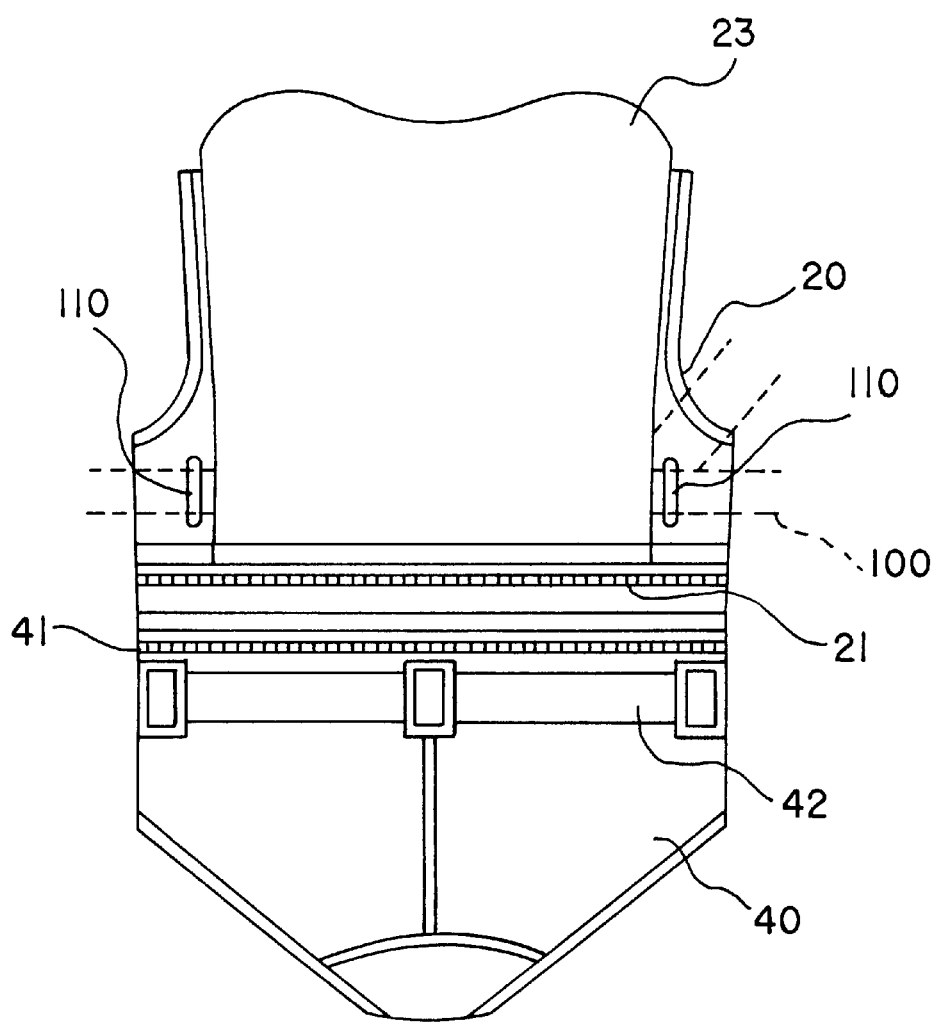
FIG. 8 is a rear view of the back rest reclining portion.

FIG. 7 is a front view of another back rest reclining portion and FIG. 8 is a rear view of the back rest reclining portion.

A back rest reclining portion 20 shown in FIGS. 7 and 8 is different from the back rest reclining portion 20 mentioned above in view that a pants type fixing portion 40 is combined in place of the fixing belt 30. The pants type fixing portion 40 is integrated with the vest type back rest reclining portion 20 by a fastener 41. A waist belt 42 is mounted to the fixing portion 40. The other structures are the same as those of the back rest reclining portion 20 mentioned above, the same reference numerals are given to the same elements as those of the back rest reclining portion 20 mentioned above, and a description will be omitted.

The back rest reclining portion 20 also securely fixes the child on the seat surface portion 10 and the cushion 23 secures a high comfortable feeling and a safety property. Further, since it is commonly used as the fixing mechanism, the structure becomes simple and a small size can be achieved.

Figure 9A:
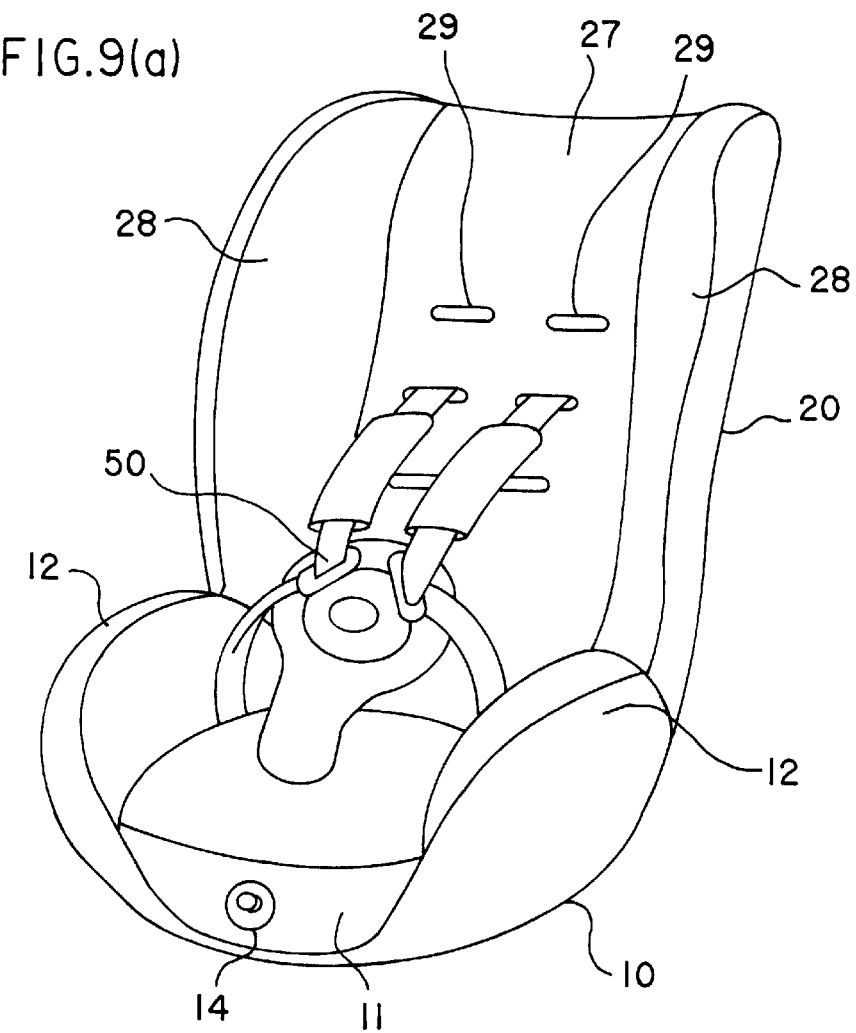
FIG. 9(*a*) is a perspective view from a front surface side of a safety seat for children in accordance with a second embodiment of the present invention, and FIG. 9(*b*) is a perspective view from a back surface side of the safety seat for children.
Figure 9B:
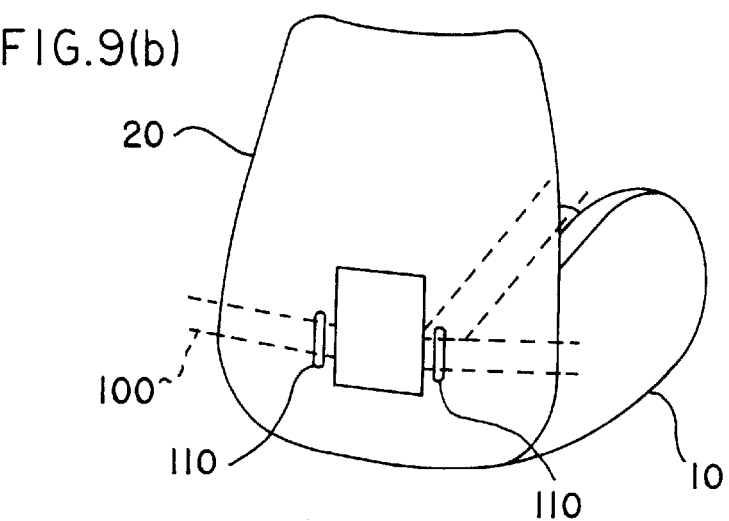
Figure 10:
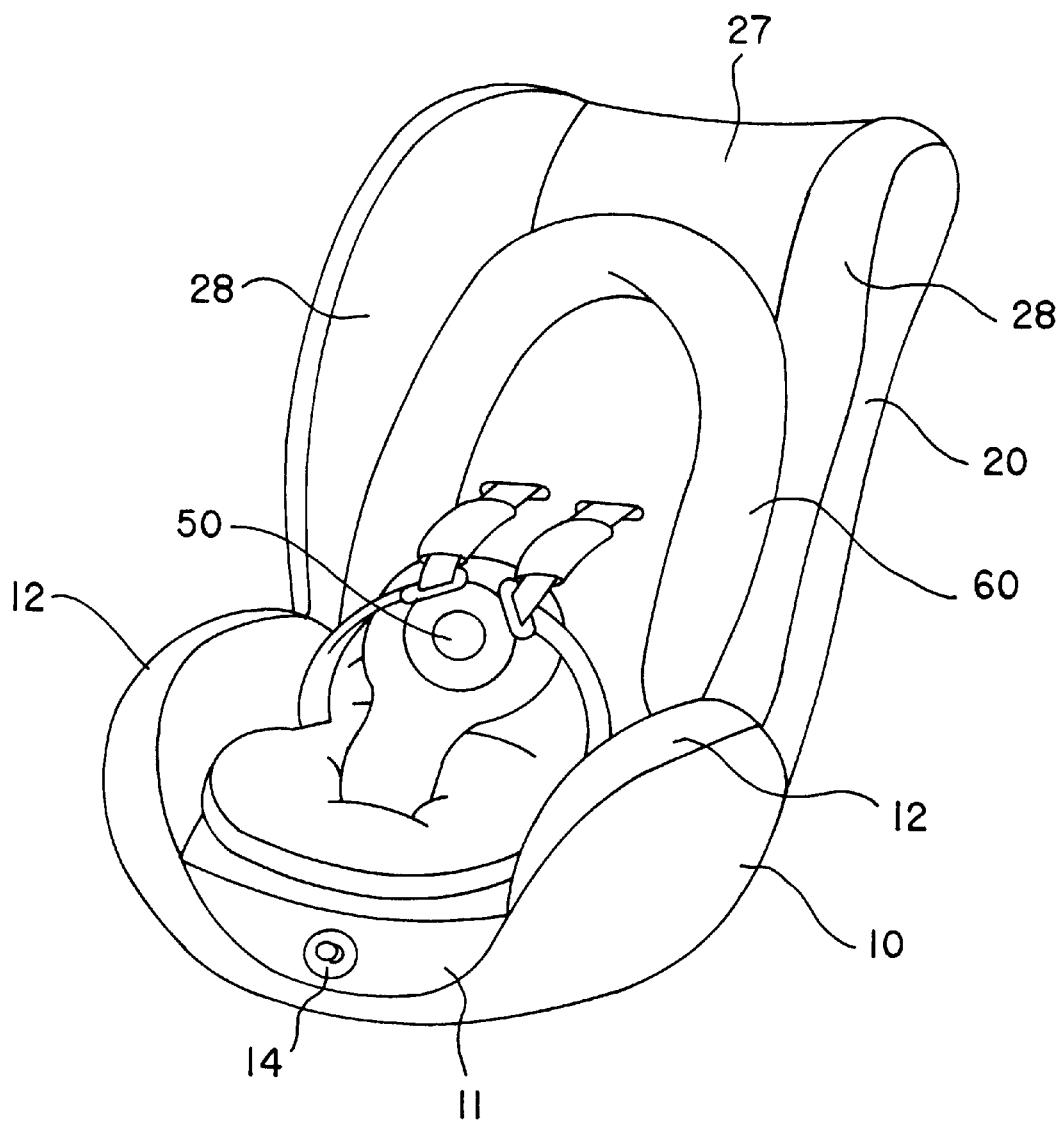
FIG. 10 is a perspective view showing a state that a baby cushion is mounted to the safety seat for children.

FIGS. 9 and 10 are perspective views of a safety seat for children in accordance with a second embodiment of the present invention.

The safety seat for children in accordance with the second embodiment is different from the safety seat for children in accordance with the first embodiment in view that the back rest reclining portion 20 is made in the same air cushion structure as that of the seat surface portion 10 so as to integrate with the seat surface portion 10.

The safety seat for children expands so as to form the same shape as that of a general safety seat for children by injecting the air from the air injection port 14 provided in the seat surface portion 10. Then, in the same manner as that of the general safety seat for children, it fixes the child by a five-point type fixing belt 50. Further, it is fixed to the seat of the motor vehicle by passing the seat belt 100 through the belt loop provided on the back surface of the back rest reclining portion 20 and directly fixing the lateral band portion of the seat belt 100 to the back surface of the back rest reclining portion 20 by the stoppers 110 and 110.

A pair of holding portions 28 and 28 continuously provided in the first holding portions 12 and 12 of the seat surface portion 10 are provided in the back rest reclining portion 20 so as to be positioned in both sides of the main body portion 27. In the main body portion 27, through holes 29 and 29 for the fixing belt 50 are formed in a plurality of stages.

The safety seat for children in accordance with the second embodiment can also make the child sit at a high position by the seat surface portion 10. Further, since the seat surface portion 10 and the back rest reclining portion 20 are made in an air cushion structure, a sitting feeling is good and it is light and can be deformed even in a state that the air is injected, so that it is easy to mount it. Further, when taking the air out of the seat surface portion 10 and the back rest reclining portion 20, it returns to the original flexible state and can be folded up small, so that it is easy to store and transfer it. Furthermore, it is possible to securely fix the child via the fixing belt 50 and it is possible to obtain an excellent safety.

Further, as shown in FIG. 10, it is possible to mount an detachable baby cushion 60.

Figure 11:
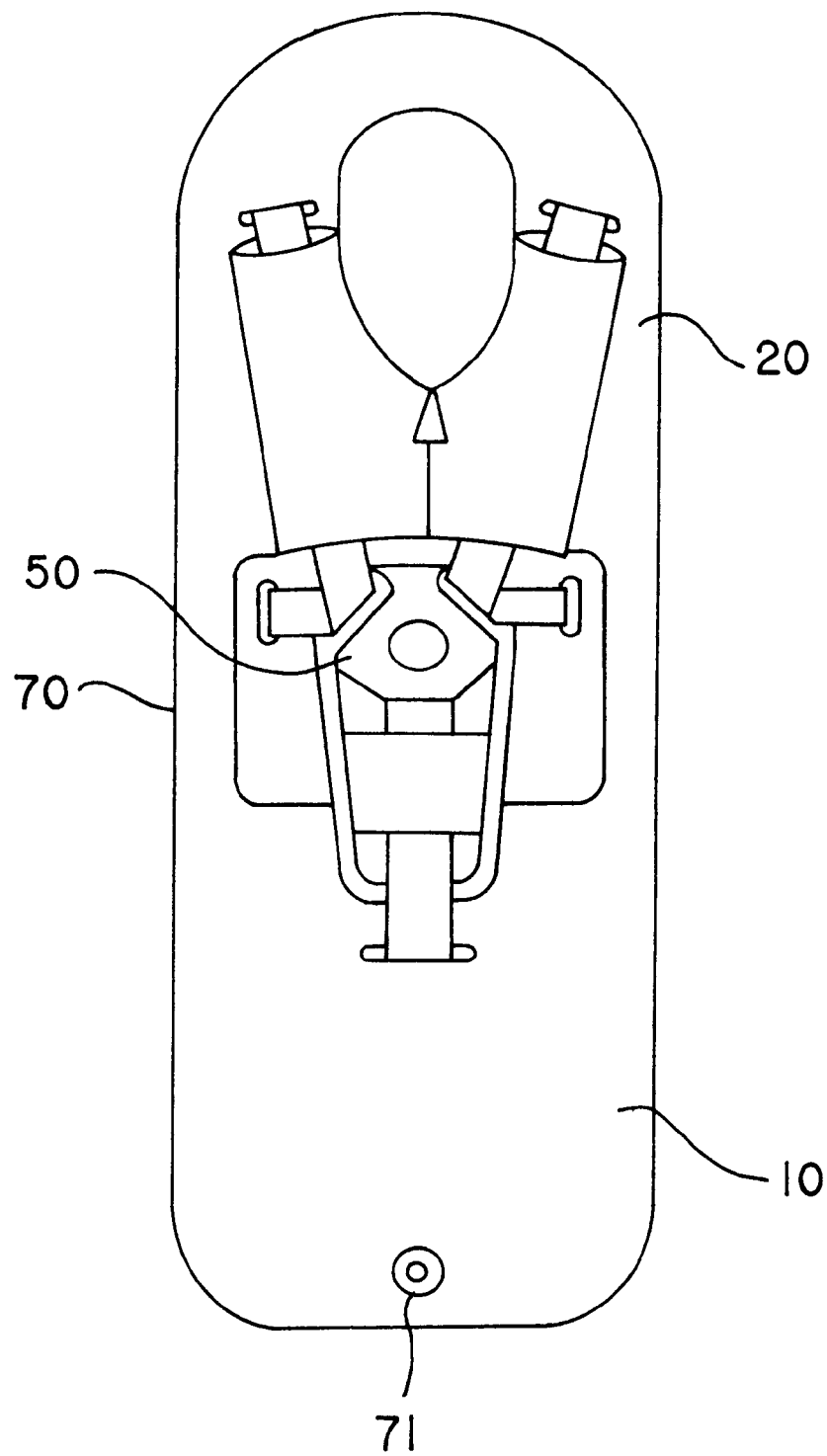
FIG. 11 is a front view of a safety seat for children in accordance with a third embodiment of the present invention.
Figure 12:
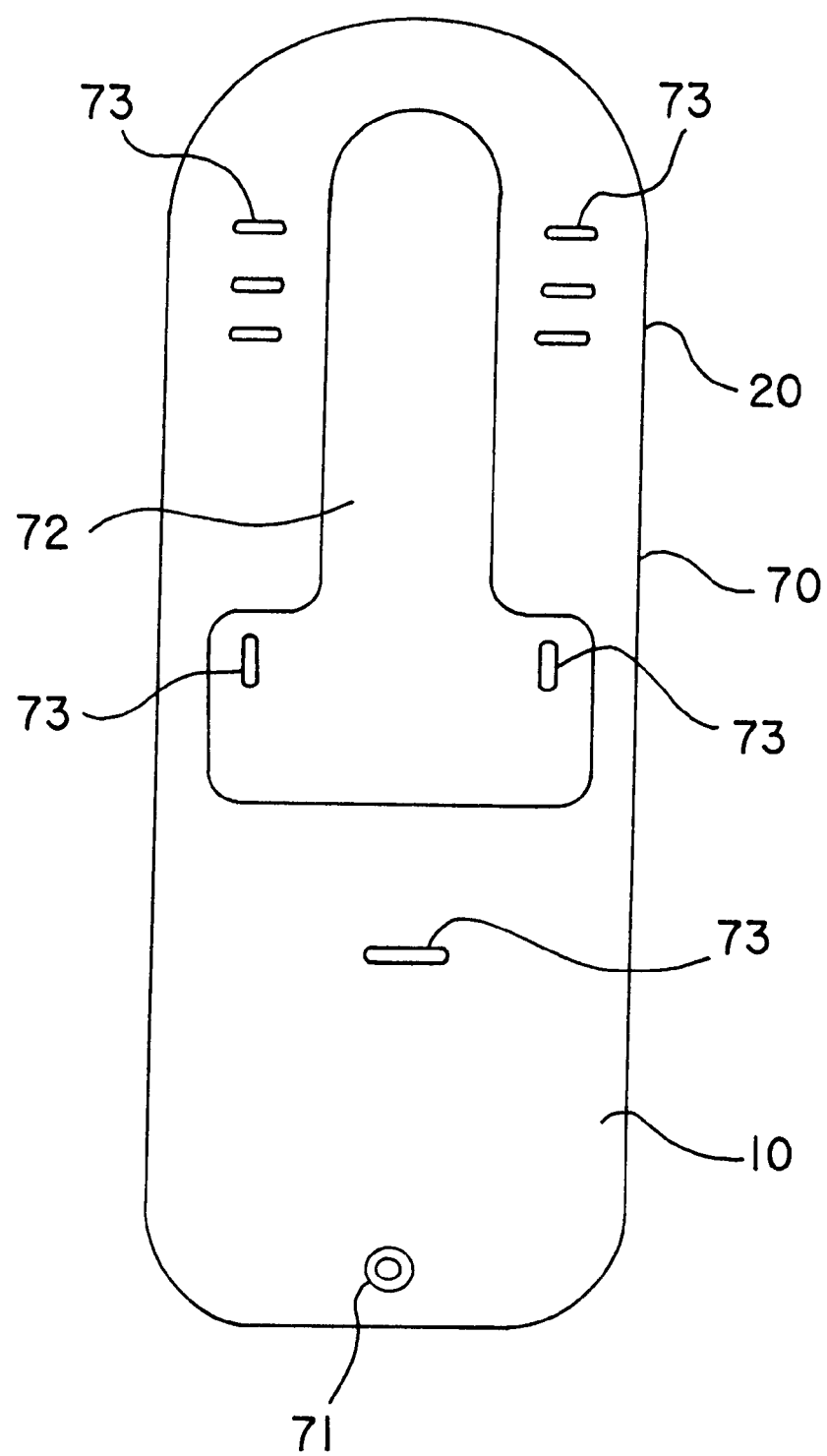
FIG. 12 is a front view showing a state that a fixing belt for the safety seat for children is taken out.
Figure 13:
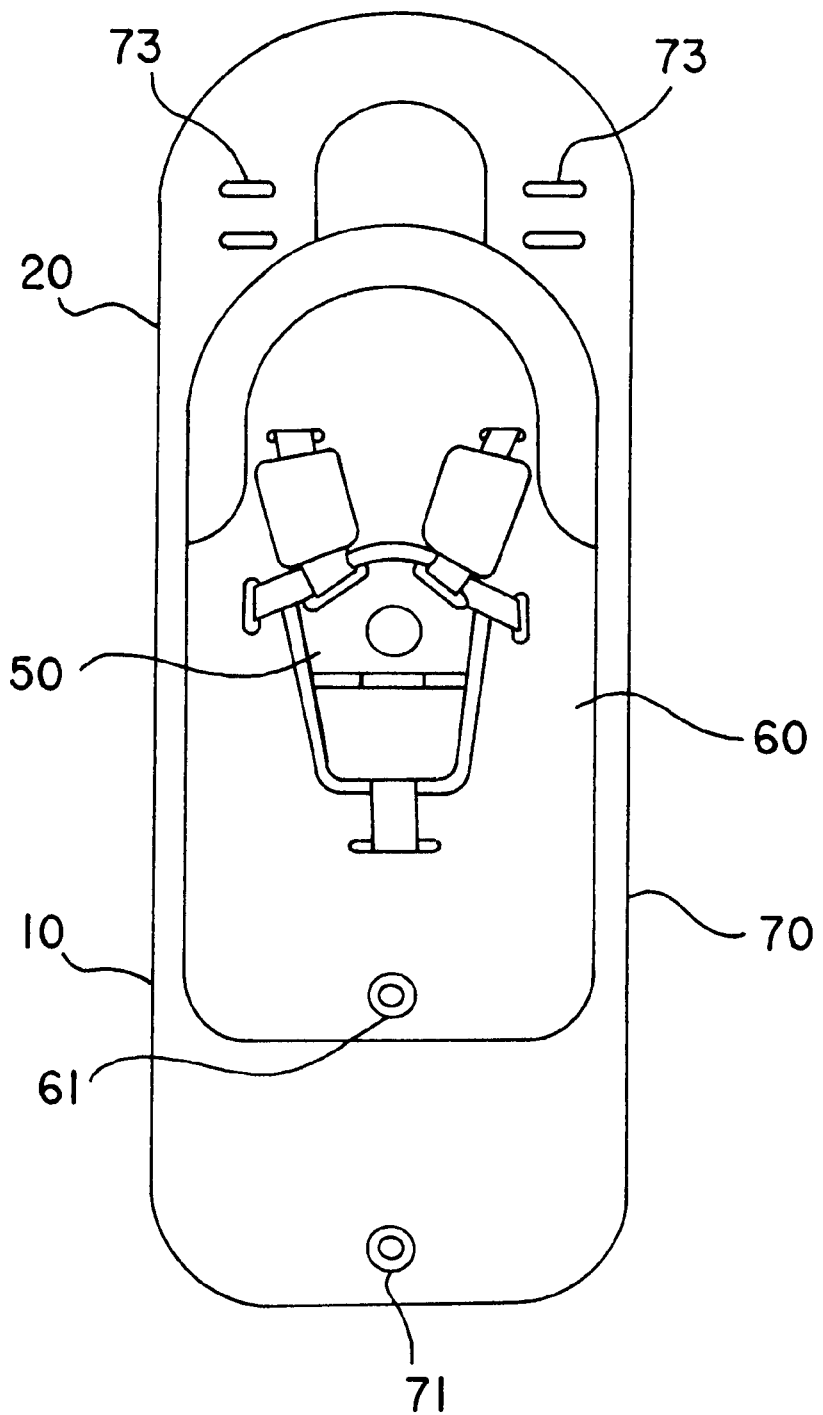
FIG. 13 a front view showing a state that a baby cushion is mounted to the safety seat for children.

FIG. 11 is a front view of a safety seat for children in accordance with a third embodiment of the present invention, FIG. 12 is a front view showing a state of taking out a fixing belt in the safety seat for children, and FIG. 13 is a front view showing a state that a baby cushion is mounted on the safety seat for children.

The safety seat for children in accordance with the third embodiment is largely different from the safety seats for children in accordance with the previous embodiments in view that the seat surface portion 10 and the back rest reclining portion 20 are formed by an airtight bag body 70 formed in an air mat shape.

As shown in FIGS. 11 and 12, the airtight bag body 70 is formed in a substantially rectangular shape and forms an air mat shape by injecting the air from an air injection port 71. When mounting this on the seat of the motor vehicle by using the seat belt, it bends along the seat surface and the back rest reclining portion, whereby the seat surface portion 10 and the back rest reclining portion 20 are formed. The child sitting on the seat surface portion 10 is fixed to the seat surface portion 10 and the back rest reclining portion 20 by the five-point type fixing belt 50. It is mounted on the seat of the motor vehicle by fixing the back rest reclining portion 20 with the seat belt and the stopper in the same manner as that of the safety seat for children in accordance with the second embodiment.

A holding property of this bag body 70 is increased by setting a portion extending from the waist to the back in a portion corresponding to the back rest reclining portion 20 and further a portion with which a head is brought into contact to a thin portion 72 to which the air is not injected, and protruding out a periphery thereof so as to form a holding portion. Reference numeral 73 denotes a through hole of the fixing belt 50.

The safety seat for children in accordance with the third embodiment can also make the child sit at a high position by the seat surface portion 10. Further, by making the back surface portion 10 and the back rest reclining portion 20 in an air cushion structure, a sitting feeling becomes good and it is light and can be deformed even in a state that the air is injected, so that it is easy mount to it. Further, since the safety seat for children returns to the original flexible state so as to be folded up small in a roll shape by taking the air out of the seat surface portion 10 and the back rest reclining portion 20, it is easy to store and transfer it. Furthermore, it is possible to securely fix the child via the fixing belt 50 and an excellent safety property can be achieved.

Further, as shown in FIG. 13, it is possible to mount the detachable baby cushion 60. Reference numeral 61 denotes an air injection port for the baby cushion 60. That is, the baby cushion 60 is also made in an air cushion structure constituted by an airtight bag body.

Figure 14:
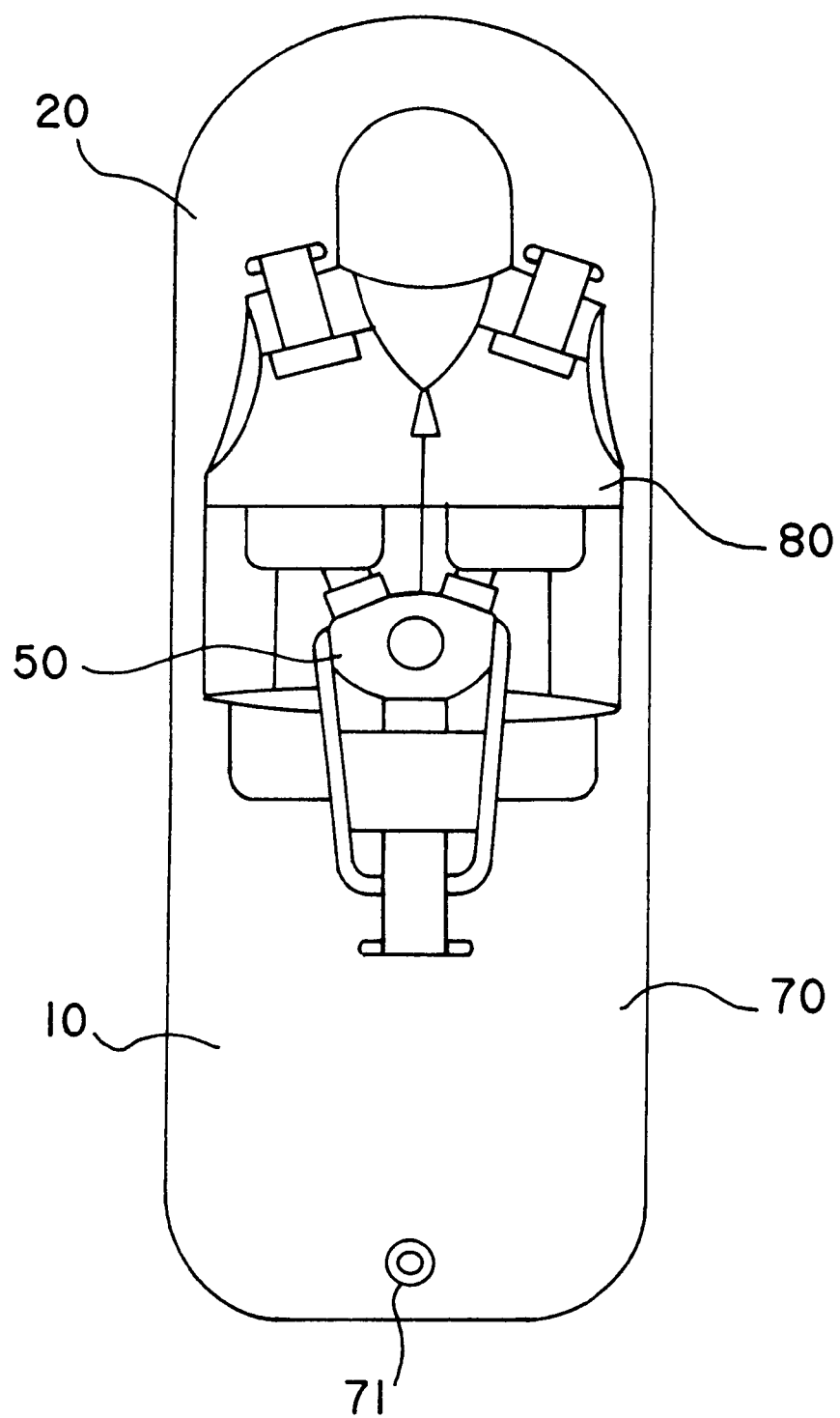
FIG. 14 is a front view of a safety seat for children in accordance with a fourth embodiment of the present invention.
Figure 15:
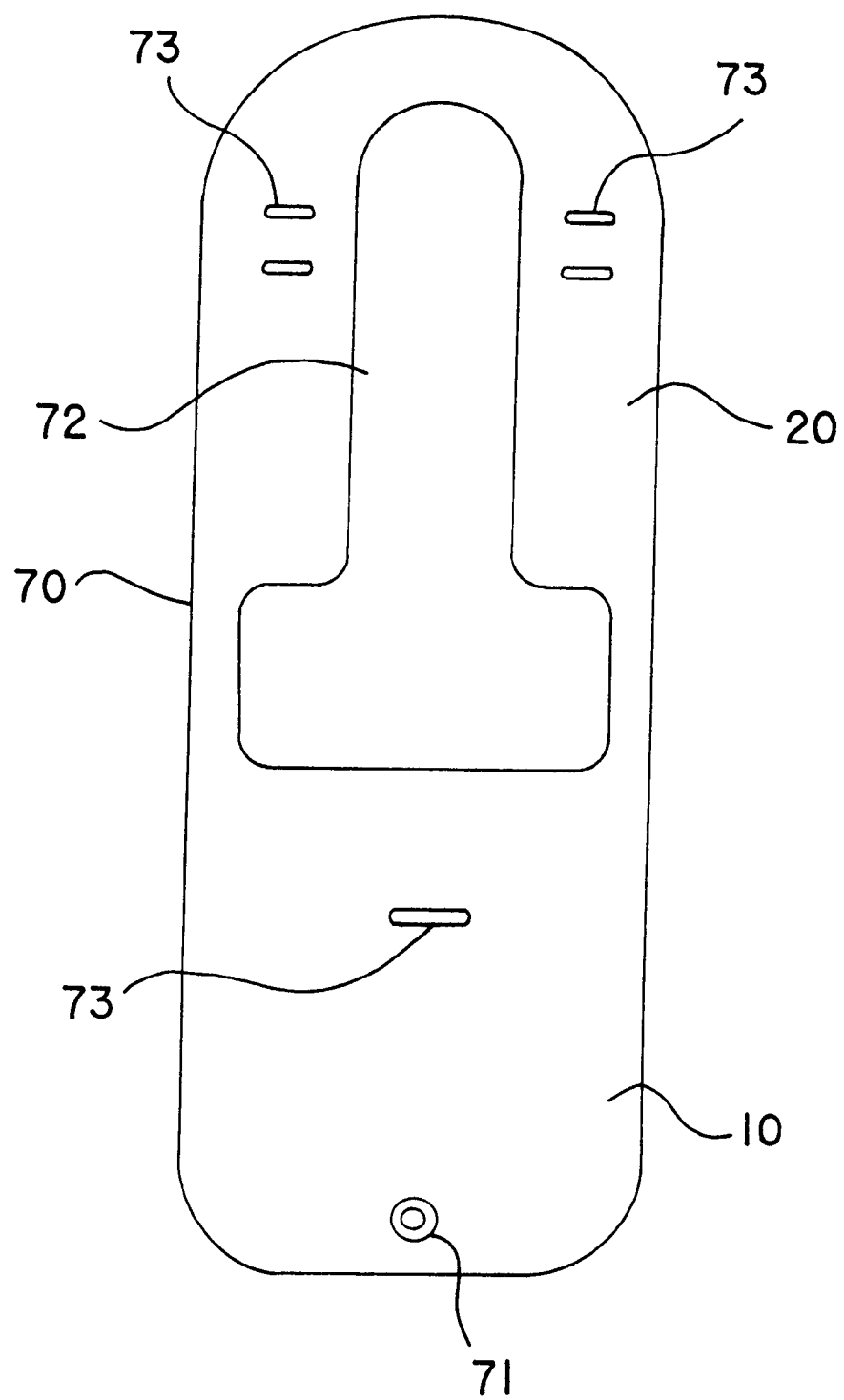
FIG. 15 is a front view showing a state that a fixing belt for the safety seat for children is taken out.
Figure 16A:
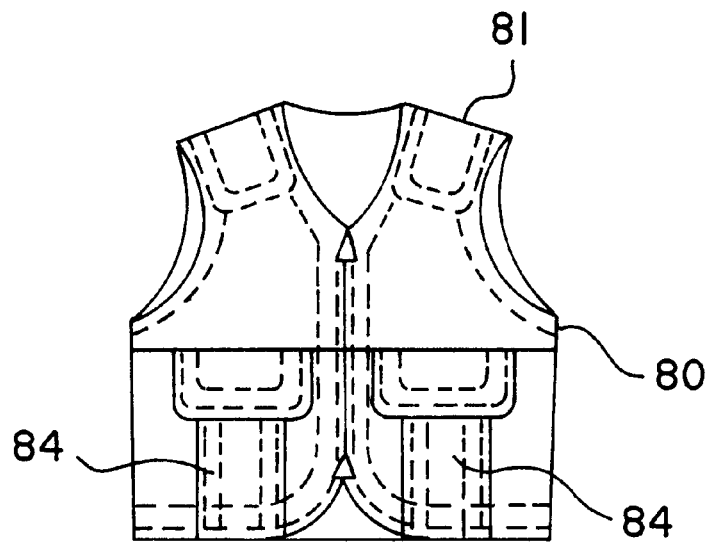
FIG. 16(*a*) is a front view of a vest type fixing portion combined with the safety seat for children and FIG. 16(*b*) is a rear view of the fixing portion.
Figure 16B:
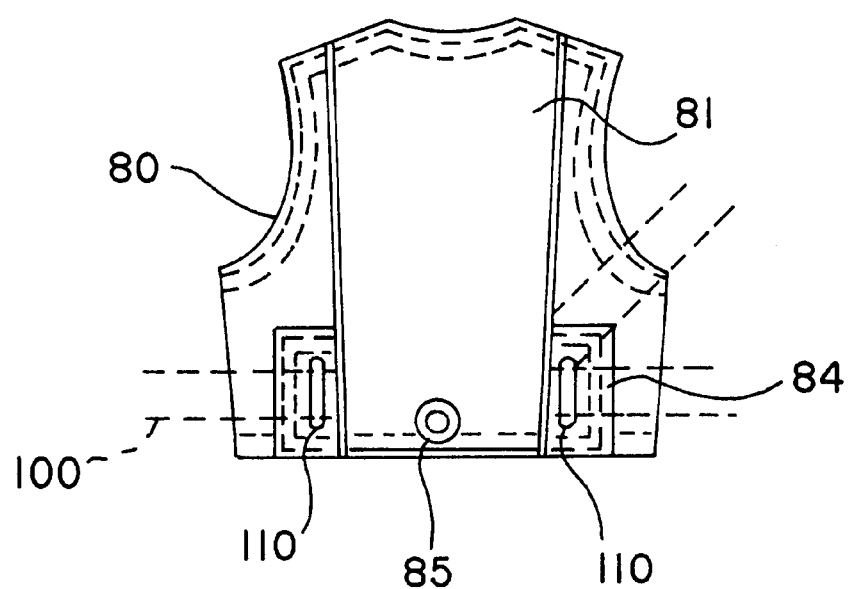
Figure 17A:
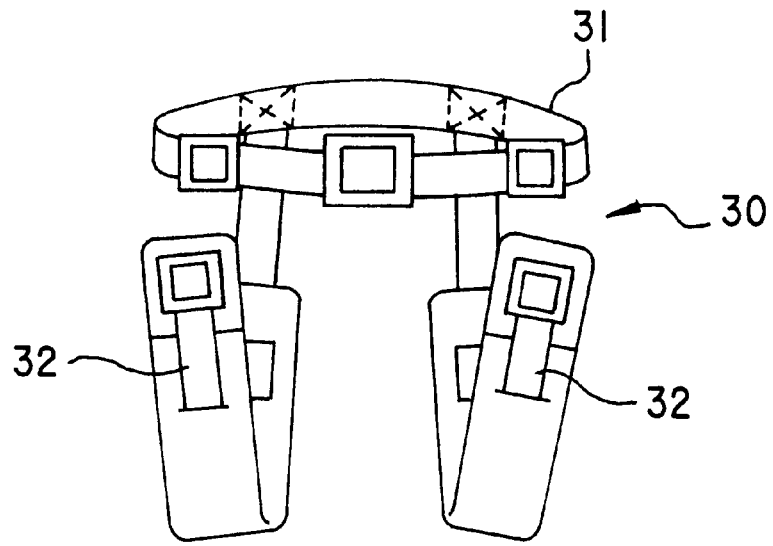
FIG. 17(*a*) is a front view of a fixing belt combined with the fixing portion and FIG. 17(*b*) shows a state of being mounted to the fixing portion.
Figure 17B:
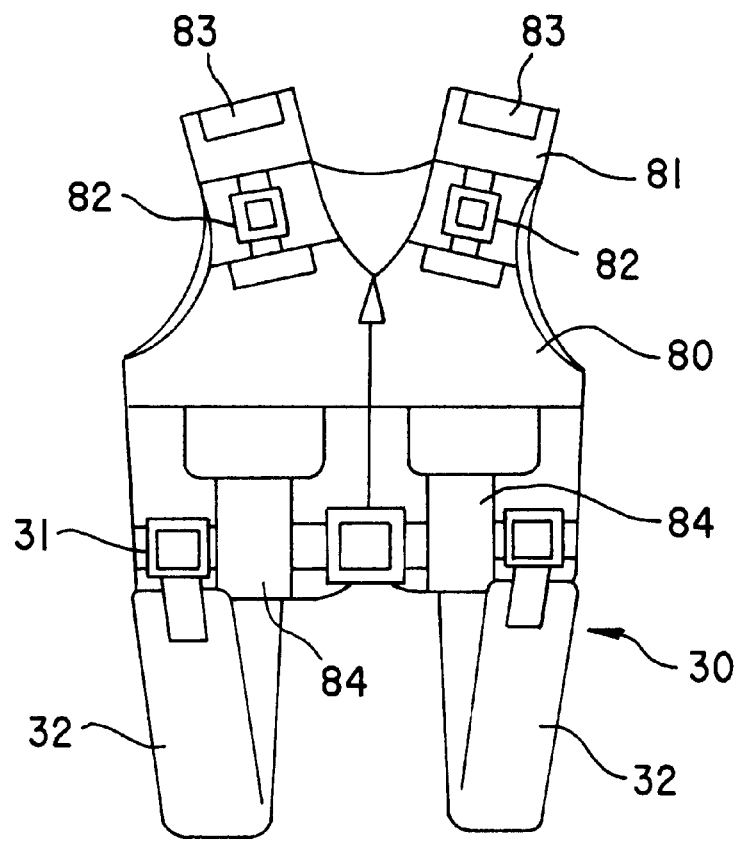

FIG. 14 is a front view of a safety seat for children in accordance with a fourth embodiment of the present invention, FIG. 15 is a front view showing a state that a fixing belt of the safety seat for children is taken out, FIG. 16 are a front view and a rear view of a vest type fixing portion combined with the safety seat for children, and FIG. 17 is a front view of a fixing belt combined with the holding portion.

As shown in FIG. 14, the safety seat for children in accordance with the fourth embodiment is structured such that a wear type fixing portion 80 having a vest shape is combined with the safety seat for children in accordance with the third embodiment. The fixing portion 80 is further combined with the crotch hanging type fixing belt 30 (refer to FIG. 17). The bag body 70 is substantially same as the safety seat for children in accordance with the third embodiment, as shown in FIG. 15. The fixing belt 50 mounted thereto is modified to a three-point supporting type from the five-point supporting type.

The vest type fixing portion 80 is fixed to the fixing belt 50 in accordance that the three-point supporting type fixing belt 50 passes through breast portions in both sides. The fixing portion 80 has substantially the same structure as that of the vest type back rest reclining portion 20 mentioned above except for this point, and an air cushion 81 is mounted to the fixing portion 80 in a portion extending from both shoulders to the back as shown in FIG. 16. The portion corresponding to both shoulders in the air cushion 81 is fixed by a surface fastener 83 for the purpose of operating a size adjusting belt 82 (refer to FIG. 17). The seat belt 100 is passed between the air cushion 81 and the main body of the fixing portion 80, and is fixed to the main body of the fixing portion 80 by the stoppers 110 and 110. Three (two front and one back) belt loops 84, 84 and 84 are provided in the lower portion of the fixing portion 80 for the purpose of mounting the fixing belt 30. Reference numeral 85 denotes an air injection port of the air cushion 81.

The crotch hanging type fixing belt 30 is structured, as shown in FIG. 17, such that two crotch belts 32 and 32 are mounted to the waist belt 31, and is mounted to the vest type fixing portion 80, by passing the waist belt 31 to the belt loops 84, 84 and 84.

The safety seat for children in accordance with the fourth embodiment can more securely fix the child by combining the vest type fixing portion 80 with the crotch hanging type fixing belt 30. The effect of this combination is as described in the first embodiment.

FIG. 18 are schematic views of a structure and a used state of a safety seat for children in accordance with a fifth embodiment of the present invention.

The safety seat for children in accordance with the fifth embodiment corresponds to a simple type obtained by making the safety seat for children in accordance with the third embodiment simple, and is slightly different therefrom in view of a structure of an airtight bag body 70 and a structure of a fixing belt 50 mounted thereto.

That is, the airtight bag body 70 is made in a structure provided with seam portions vertically and transversely just as an air mat. Further, the fixing belt 50 is modified to the three-point supporting type from the five-point supporting type.

A mat-shaped air cushion is formed by injecting the air to the airtight bag body 70, and the seat surface portion 10 and the back rest reclining portion 20 are formed by mounting the mat-shaped air cushion on the seat of the motor vehicle by using the seat belt so as to bend it along the seat surface and the back rest, in the same manner as that of the safety seat for children in accordance with the third embodiment. Further, a method of fixing to the seat of the motor vehicle is also the same as that of the safety seat for children in accordance with the third embodiment.

The safety seat for children in accordance with the fifth embodiment can also make the child sit at a high position by the seat surface portion 10 although it is a simple type. Further, since the seat surface portion 10 and the back rest reclining portion 20 are made in the air cushion structure, a sitting feeling is good and the safety seat for children is light and can be deformed even in a state that the air is injected, so that it is easy mount to it. Further, since the safety seat for children returns to the original flexible state by taking the air out of the seat surface portion 10 and the back rest reclining portion 20 so as to be folded up small in a roll shape, it is easy to store and transfer it. Further, it is possible to securely fix the child via the fixing belt 50 and an excellent safety property can be achieved.

FIG. 19 are schematic views of a structure and a used state of a safety seat for children in accordance with a sixth embodiment of the present invention.

The safety seat for children in accordance with the sixth embodiment is different from the safety seat for children in accordance with the fifth embodiment in a view that a fixing portion of a vest type and having a wholly air cushion structure is integrally formed in a portion corresponding to the back rest reclining portion 20 of the air mat shaped bag body 70 and the fixing belt 50 is omitted.

This safety seat for children corresponds to a structure obtained by making the safety seat for children in accordance with the fifth embodiment more compact, however, the child can be effectively fixed in such a state that a life jacket is worn thereon and can be also protected.

Figure 21:
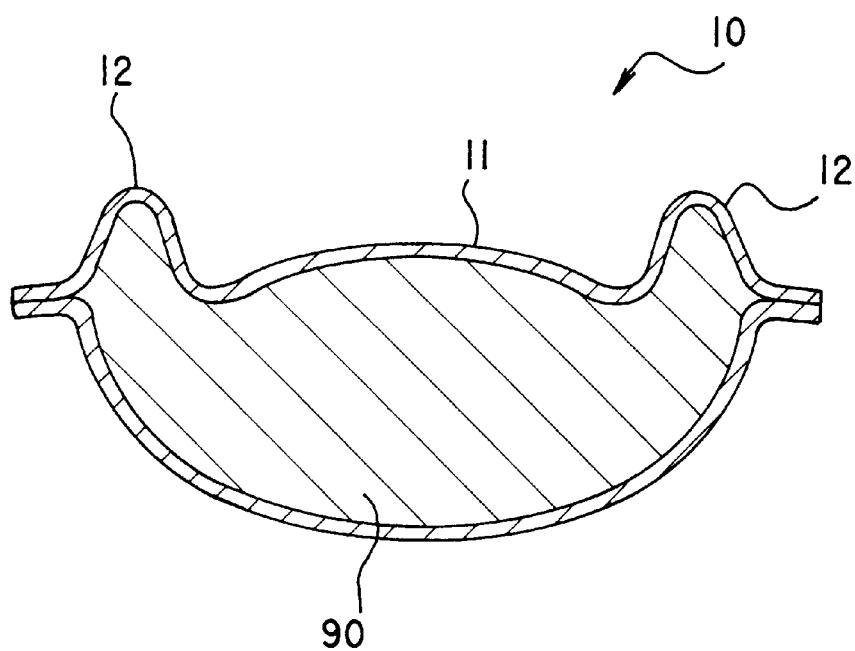
FIG. 21 is a sectional view of a seat surface portion of a safety seat for children in accordance with a seventh embodiment of the present invention.

FIG. 21 is a sectional view of a seat surface portion of a safety seat for children in accordance with a seventh embodiment of the present invention.

In the safety seats for children in accordance with the first embodiment to the sixth embodiment, the air is injected to the portion forming to the air cushion, however, in the safety seat for children in accordance with the seventh embodiment, the structure is made such that the air is automatically sucked without injecting the air.

That is, as shown in FIG. 12, a space containing an air such as an urethane or the like is formed in an inner portion and a material 90 having a property intending to expand outward when being pressed and compressed is injected. For example, in the case that the material 90 mentioned above is injected in the inner portion of the seat surface portion 10, the seat surface portion 10 automatically expands up due to a force obtained at a time when the material 90 intends to expand outward, by opening an air suction port (not shown) (which is the same as the air injection port 14 in the embodiments mentioned above), and at the same time, the air is sucked into the inner portion of the seat surface portion 10. When the air suction port is closed in a state that the material 90 expands up, the seat surface portion 10 is formed.

The seat surface portion 10 formed in such the manner deforms along a body type of the sitting child so as to protect the child since an amount of injected air is less than that of the type injecting the air. Further, when forcibly injecting the air into the inner portion of the seat surface portion 10 before closing the air suction port, the structure becomes the same as that of the structure in which the air is injected. In this case, since the most of the air is sucked so as to be injected into the inner portion of the seat surface portion 10, the amount of forcibly injected air is reduced, so that there is an effect that an air injection can be easily executed.

As mentioned above, the structure is made such that the material 90 having the space containing the air such as the urethane or the like and the property intending to expanding outward at a time of being pressed and compressed is injected in the seat surface portion 10, however, it goes without saying that it is injected not only in the seat surface portion 10 but also in the back rest reclining portion 20.

Next, an eighth embodiment of the present invention will be described with reference to FIGS. 22 to 25.

Figure 22:
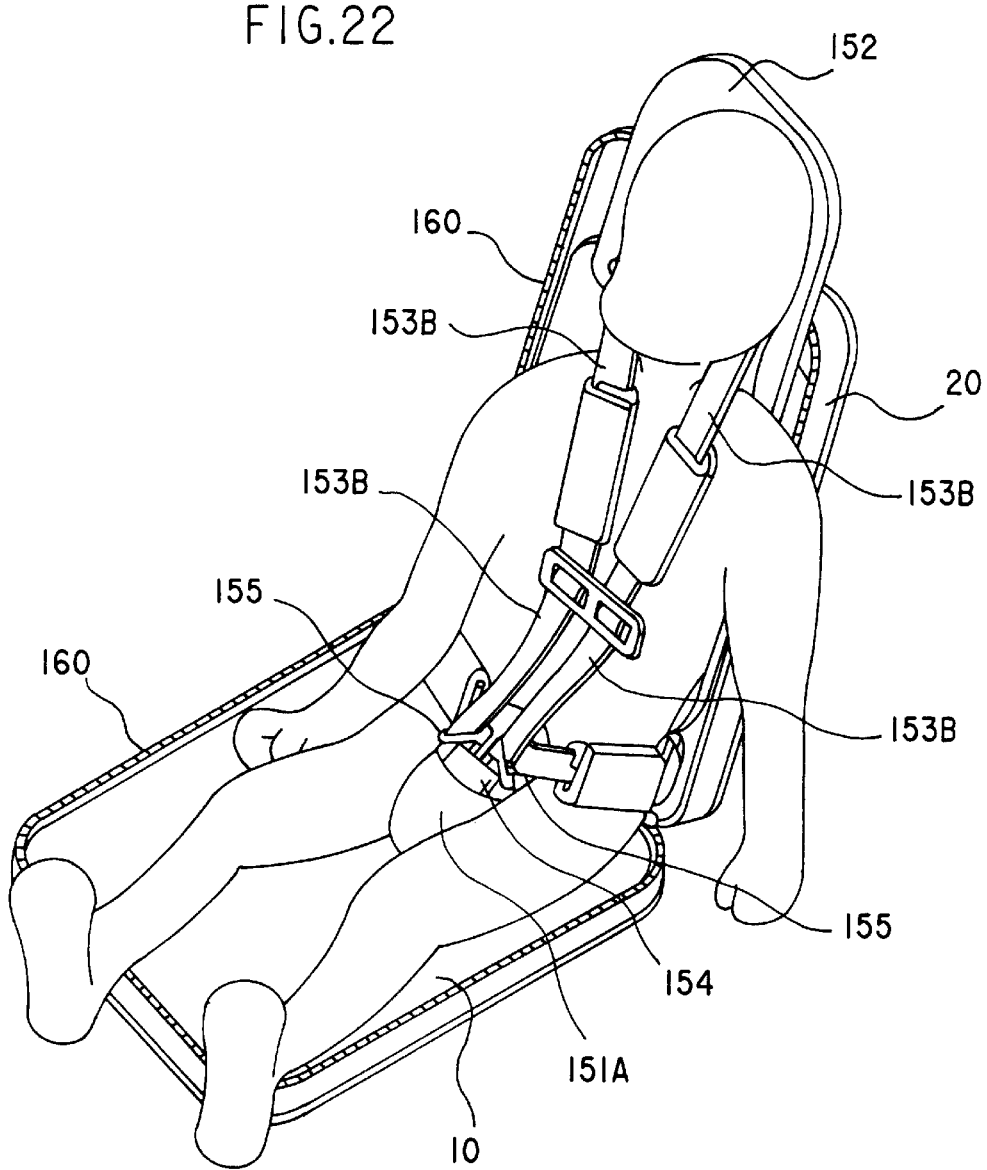
FIG. 22 is a perspective view of a state of opening a safety seat for children in accordance with an eighth embodiment of the present invention.
Figure 23:
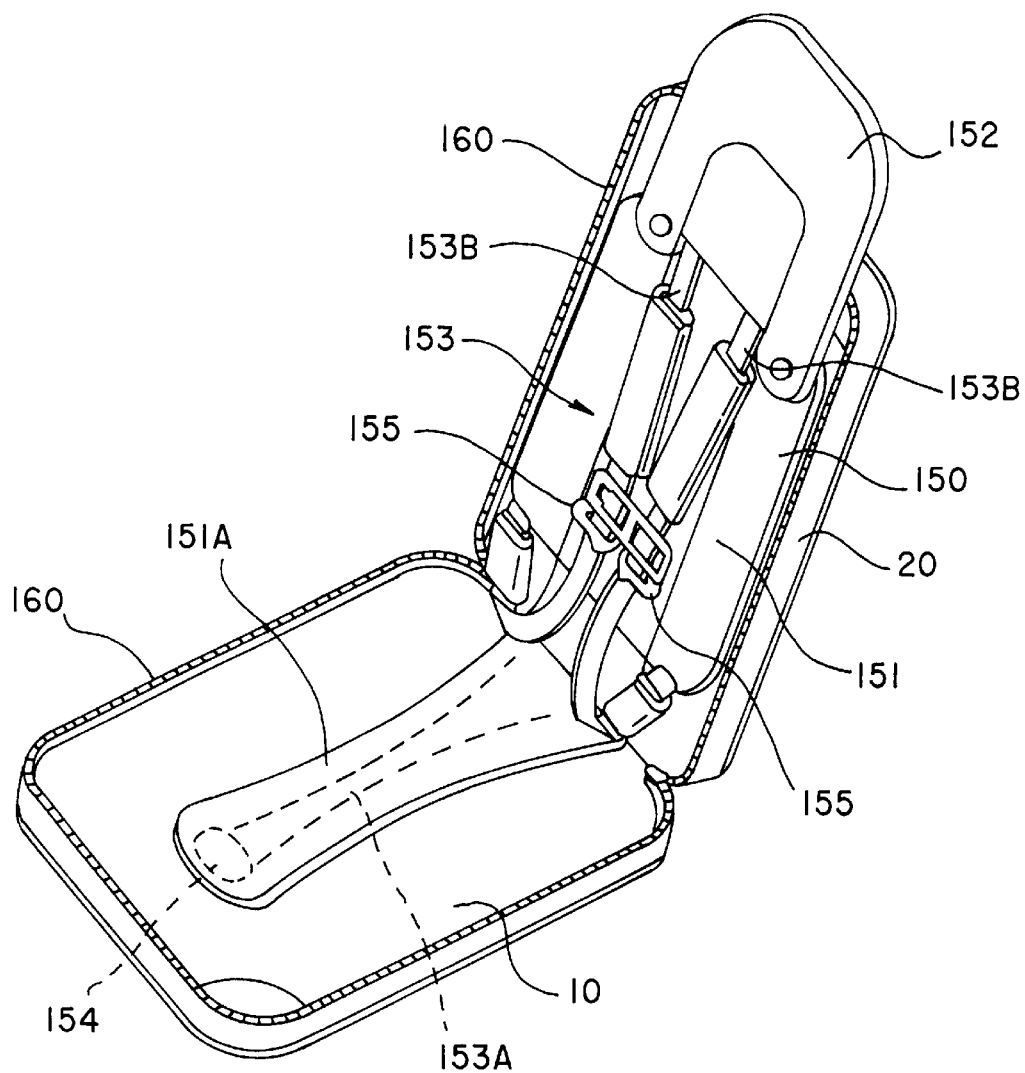
FIG. 23 a perspective view showing a used state of the safety seat for children in accordance with the eighth embodiment of the present invention.
Figure 24:
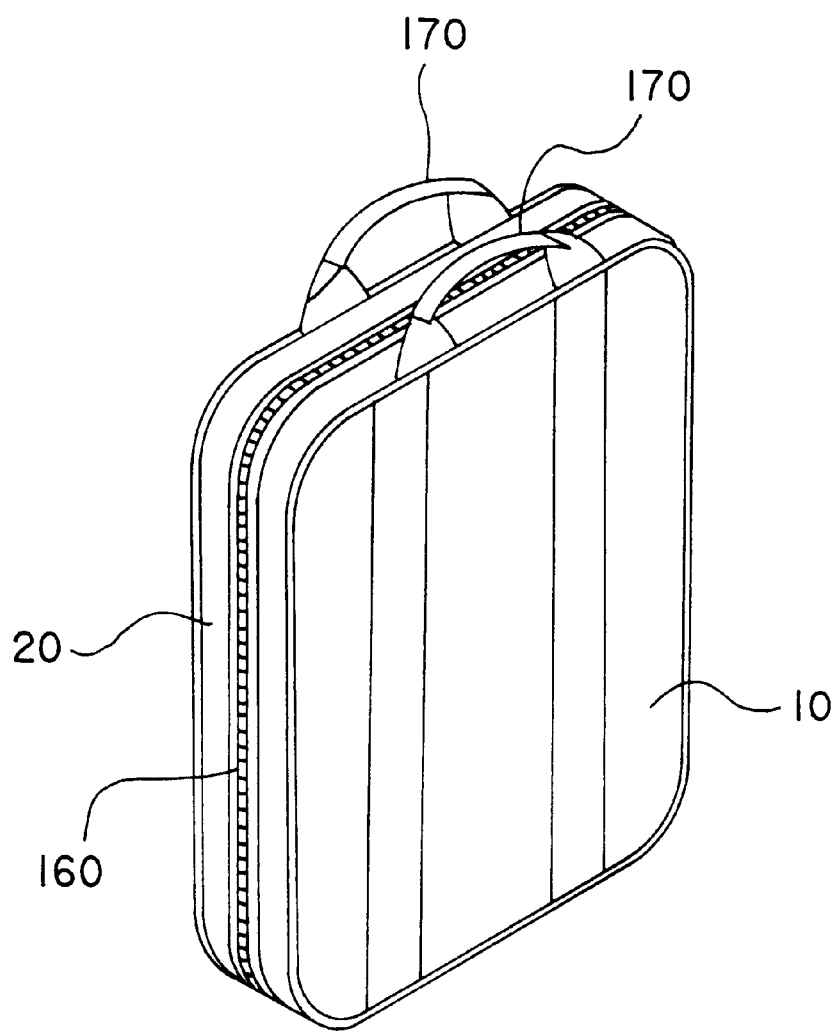
FIG. 24 is a perspective view of a state of closing the safety seat for children in accordance with the eighth embodiment of the present invention.

FIGS. 22 to 25 show the eighth embodiment in accordance with the present invention, in which FIG. 22 is a perspective view showing a used state of a safety seat for children in accordance with the eighth embodiment, FIG. 23 is a perspective view of a state of opening the safety seat for children in accordance with the eighth embodiment, FIG. 24 is a perspective view of a state of closing the safety seat for children in accordance with the eighth embodiment, and FIG. 25 is a sectional view of a state of closing the safety seat for children in accordance with the eighth embodiment.

The safety seat for children in accordance with the eighth embodiment is provided with the seat surface portion 10 and the back rest reclining portion 20 constituted by a flexible structure, and is structured such that the seat surface portion 10 and the back rest reclining portion 20 are constituted by an airtight bag body 91 which expands due to a suction of gas so as to form an air cushion, the back rest reclining portion 20 has a fixing mechanism 150 with respect to a child, the back rest reclining portion 20 is the safety seat for children having a fixing mechanism with respect to the seat of the motor vehicle, and a slide fastener 160 corresponding to a connecting means for closing both elements to each other is provided in the seat surface portion 10 and the back rest reclining portion 20.

This safety seat for children is most different from the embodiments mentioned above in a view that the seat surface portion 10 and the back rest reclining portion 20 are closed to each other at a time of not being used so as to be compact for being convenient at a time of being carried.

The seat surface portion 10 mentioned above is installed with a bag body 91 in an inner portion thereof as shown in FIG. 25. A space containing the air such as the urethane or the like is formed in an inner portion of the bag body 91, and simultaneously the material 90 having the property intending to expand outward when being pressed and compressed is injected therein. The same bag body 91 is also installed in the inner portion of the back rest reclining portion 20.

Further, the fixing mechanism 150 with respect to the child is provided in the back rest reclining portion 20 mentioned above. The fixing mechanism 150 has a back rest member 151 mounted to the back rest reclining portion 20 by a surface fastener (not shown), a head portion protecting member 152 detachably mounted to the back rest member 151 and a multi-point fixing belt 153.

A crotch rest portion 151A passing through a crotch portion of the child in a state of being mounted to the back rest reclining portion 20 is provided in a lower end of the back rest member 151. The crotch rest portion 151A corresponds to a portion to which a crotch belt 153A constituting the fixing belt 153 is inserted. In this case, in FIG. 23, since the crotch belt 153A is inserted into the crotch rest portion 151A, it is shown by a broken line. The head portion protecting member 152 is detachably mounted to an upper end of the back rest member 151 by a suitable means such as a hook, a surface fastener or the like.

Further, the fixing belt 150 has a pair of shoulder belts 153B having engagement hooks 155 engaging with a lock member 154 mounted to a front end of the crotch belt 153A, in addition to the crotch belt 153A. The shoulder belt 153B is fixed to the back rest reclining portion 20 at four points, and is structured such as to fix the child around the waist and around the shoulders at a time of being used.

Furthermore, the seat surface portion 10 and the back rest reclining portion 20 are structured such that they are connected at one end and the slide fastener 160 is provided in an edge portion which is not connected. Accordingly, the seat surface portion 10 and the back rest reclining portion 20 are structured such as to be closed to each other by closing the slide fastener 160.

Further, a strap 170 forming a carrying handle in a state that the seat surface portion 10 and the back rest reclining portion 20 are closed to each other by the slide fastener 160 is formed in a portion which is not connected in the seat surface portion 10 and the back rest reclining portion 20. Accordingly, this safety seat for children forms a bag shape as shown in FIG. 24 by closing the seat surface portion 10 and the back rest reclining portion 20 to each other by the slide fastener 160. In this case, at this time, the air is taken out of the bag body 91 and the head portion protecting member 152 is taken out from the back rest member 151. The safety seat for children formed in the bag shape becomes compact and can be easily carried.

This safety seat for children is mounted to the seat of the motor vehicle in the following manner. That is, the seat belt of the motor vehicle, is passed between the back rest member 151 of the fixing mechanism 150 and the back rest reclining portion 20 to which the back rest member 151 is mounted with the surface fastener. The back rest reclining portion 20 is pressed to the seat side by the seat belt, and the back rest member 151 is pressed to the seat side by the child fixed by the fixing belt 150 fixed to the back rest reclining portion 20. In the manner mentioned above, the safety seat for children is mounted to the seat of the motor vehicle.

Accordingly, the fixing mechanism with respect to the seat of the motor vehicle in the safety seat for children is commonly used as the fixing mechanism 150 with respect to the child.

In this case, it is preferable that a strap 170 is pressed to the back side of the seat surface portion 10 and the back rest reclining portion 20 at a time of being used, so as to prevent it from entwining the child. Accordingly, in FIGS. 22 and 23, the strap 170 does not appear.

In this case, in the embodiments mentioned above, in order to avoid an expansion due to an increase of a room temperature of the motor vehicle in summer season, a pressure adjusting valve may be provided in the portion forming the air mat.

EFFECT OF THE INVENTION

As described above, since the safety seat for children in accordance with the present invention is provided with the seat surface portion and the back rest reclining portion having the flexible structure, and at least the seat surface portion among the seat surface portion and the back rest reclining portion is constituted by the airtight bag body which expands due to the injection of the gas so as to form the air cushion, it is possible to make the child sit at the high position and it is possible to widely reduce the uncomfortable feeling of the child in spite that the back surface portion and the back rest reclining portion are made in the flexible structure which is easily transferred and stored. Further, since the sitting feeling is good and it is possible to be deformed in spite of being light even in a state that the air is injected, it is easy to mount it.

Further, by mounting the air cushion to the shoulder portions, it is possible to reduce the pressure applied to the shoulder portions at a time of collision and it is possible to previously prevent the clavicle or the like from being broken.

What is claimed is:

1. A safety seat for children comprising a seat surface portion and a back rest reclining portion, wherein at least the back rest reclining portion, between the seat surface portion and the back rest reclining portion, has a fixing mechanism with respect to a child, at least one of the seat surface portion and the back rest reclining portion has a fixing mechanism with respect to a motor vehicle seat, and said seat surface portion and said back rest reclining portion are attached to each other on one side and adapted to be closed or opened along a joint of said seat surface portion and said back rest reclining portion.

2. The safety seat for children as claimed in claim 1, wherein a connecting means is provided in an edge portion of said seat surface portion and said back rest reclining portion to fix the safety seat in a closed position.

3. The safety seat for children as claimed in claim 2, wherein the connecting means is a slide fastener.

4. The safety seat for children as claimed in claim 1, wherein a strap is provided in said seat surface portion and/or said back rest reclining portion for carrying the safety seat in a closed position.

5. The safety seat for children as claimed in claim 1 wherein at least the seat surface portion, between the seat surface portion and the back rest reclining portion, is constituted by an airtight bag body expanding due to an injection or suction of gas so as to form an air cushion.

6. The safety seat for children as claimed in claim 5, wherein the airtight bag body expanding due to a suction of gas is filled with a urethane or other elastic material and expands when an air suction portion connected to the bag body is opened and the elastic material suctions a gas to expand.

7. The safety seat for children as claimed in claim 1, wherein the fixing mechanism provided in said back rest reclining portion with respect to the child has a wearable vest-shaped fixing portion.

8. The safety seat for children as claimed in claim 7, wherein said wearable fixing portion has an air cushion at least in a portion of therof.

9. The safety seat for children as claimed in claim 7, wherein the back end of a crotch strap fixing belt is attached to a back side of the wearable fixing portion so that the opposite end of said crotch strap fixing belt is connected to a front side of the wearable fixing portion.

10. The safety seat for children as claimed in claim 7, wherein the wearable fixing portion is combined with a fixing portion that includes pants.

11. The safety seat for children as claimed in claim 7, wherein the wearable fixing portion is adapted to be attached to and detached from said back rest reclining portion.

12. The safety seat for children as claimed in claim 1, wherein the fixing mechanism with respect to the child comprises a multi-point supporting fixing belt 3.

* * * * *